United States Patent
Periasamy et al.

(10) Patent No.: US 9,889,826 B2
(45) Date of Patent: Feb. 13, 2018

(54) VARIABLE RATIO BRAKE PEDAL

(71) Applicant: VENTRA GROUP, CO., Halifax, Nova Scotia (CA)

(72) Inventors: Ramesh Periasamy, Markham (CA); Dusit Sukonthapanich, Newmarket (CA); Steve Jarjoura, Barrie (CA)

(73) Assignee: Ventra Group Co., Halifax, Nova Scotia (CA)

( * ) Notice: Subject to any disclaimer, the term of this patent is extended or adjusted under 35 U.S.C. 154(b) by 40 days.

(21) Appl. No.: 14/184,588

(22) Filed: Feb. 19, 2014

(65) Prior Publication Data

US 2015/0232072 A1 Aug. 20, 2015

(51) Int. Cl.

| G05G 1/30 | (2008.04) |
|---|---|
| B60T 7/06 | (2006.01) |
| G05G 1/327 | (2008.04) |
| G05G 1/44 | (2008.04) |
| G05G 1/46 | (2008.04) |
| B60T 11/18 | (2006.01) |

(52) U.S. Cl.
CPC .............. B60T 7/06 (2013.01); B60T 11/18 (2013.01); G05G 1/327 (2013.01); G05G 1/44 (2013.01); G05G 1/46 (2013.01); *Y10T 74/20528* (2015.01)

(58) Field of Classification Search
CPC .. G05G 1/46; G05G 1/36; G05G 1/44; G05G 7/04; B60T 7/06
See application file for complete search history.

(56) References Cited

U.S. PATENT DOCUMENTS

| 3,858,457 A | * | 1/1975 | Mathues | ................. B60T 7/06 74/512 |
|---|---|---|---|---|
| 3,911,760 A | * | 10/1975 | Elbers | ..................... B60T 7/06 74/512 |
| 4,615,235 A | | 10/1986 | Horvath | |

(Continued)

FOREIGN PATENT DOCUMENTS

| DE | 32 03 235 A1 | 8/1983 |
|---|---|---|
| DE | 10 2007 032515 A1 | 2/2009 |

(Continued)

OTHER PUBLICATIONS

First Examination Report dated Apr. 28, 2014 of European Appl. No. 14159229.5 (7 pages).

(Continued)

*Primary Examiner* — Vicky A Johnson
(74) *Attorney, Agent, or Firm* — Pillsbury Winthrop Shaw Pittman, LLP

(57) ABSTRACT

Provided herein is a variable ratio pedal assembly for a vehicle for operating a push rod of a brake system, for example. The assembly includes at least one activation link connected via a pivot tube to an elongated lever structure of the pedal arm, an input link for connection to the push rod to activate the brake system that is operatively connected to the activation link, and an intermediate link connected to the input link and a vehicle bracket. The intermediate link pivots relative to the input link and the vehicle bracket, resulting in a variation in angle between the input link and the intermediate link. The variation in angle between the input link and the intermediate link creates a ratio that varies as the pedal arm is moved.

23 Claims, 10 Drawing Sheets

(56) References Cited

U.S. PATENT DOCUMENTS

| | | |
|---|---|---|
| 5,615,749 A | 4/1997 | Kato |
| 5,921,144 A | 7/1999 | Williams |
| 5,983,746 A | 11/1999 | Nawata et al. |
| 5,996,440 A | 12/1999 | Nawata |
| 6,041,674 A | 3/2000 | Kato |
| 6,055,883 A | 5/2000 | Kato |
| 6,070,488 A | 6/2000 | Yabusaki |
| 6,070,489 A | 6/2000 | Ananthasivan |
| 6,076,422 A | 6/2000 | Tabata |
| 6,082,219 A | 7/2000 | Wolpert |
| 6,089,119 A | 7/2000 | Leboisne |
| 6,089,342 A | 7/2000 | Muller |
| 6,101,894 A | 8/2000 | Tiemann |
| 6,112,615 A | 9/2000 | Nawata |
| 6,112,616 A | 9/2000 | Schonlau |
| 6,142,036 A | 11/2000 | Mizuma |
| 6,176,340 B1 | 1/2001 | Mizuma et al. |
| 6,178,846 B1 | 1/2001 | Specht |
| 6,182,525 B1 | 2/2001 | Bowers |
| 6,182,526 B1 | 2/2001 | Brooks |
| 6,186,025 B1 | 2/2001 | Engelgau |
| 6,209,416 B1 | 4/2001 | Tiemann |
| 6,279,417 B1 | 8/2001 | Mizuma |
| 6,336,376 B1 | 1/2002 | Lee |
| 6,354,171 B1 | 3/2002 | Wolpert |
| 6,364,046 B1 | 4/2002 | Forssell |
| 6,375,220 B1 | 4/2002 | Kamm |
| 6,393,934 B1 | 5/2002 | Rixon et al. |
| 6,408,711 B1 | 6/2002 | Mizuma |
| 6,418,812 B2 | 7/2002 | Mizuma |
| 6,481,311 B1 | 11/2002 | Sanagi |
| 6,539,823 B1 | 4/2003 | Tomono |
| 6,565,160 B1 | 5/2003 | Ewing |
| 6,571,659 B2 | 6/2003 | Choi |
| 6,655,489 B2 | 12/2003 | Kawai |
| 6,658,964 B2 | 12/2003 | Bang |
| 6,679,135 B1 | 1/2004 | Faigle |
| 6,701,800 B2 | 3/2004 | Saitou |
| 6,742,411 B2 | 6/2004 | Aoki |
| 6,752,038 B2 | 6/2004 | Cordero |
| 6,786,109 B2 | 9/2004 | Mueller |
| 6,808,040 B2 | 10/2004 | Hayashihara |
| 6,810,766 B2 | 11/2004 | Mizuma |
| 6,817,436 B2 | 11/2004 | Yang |
| 6,889,575 B2 * | 5/2005 | Thistleton ............... B60R 21/09 74/512 |
| 6,898,995 B1 | 5/2005 | Schonlau |
| 6,918,318 B2 * | 7/2005 | Willemsen ............... B60T 7/06 74/512 |
| 6,951,152 B2 | 10/2005 | Strole |
| 7,059,213 B2 | 6/2006 | Burgstaler |
| 7,077,028 B2 | 7/2006 | Misonou |
| 7,096,755 B2 | 8/2006 | Cha |
| 7,111,703 B2 | 9/2006 | Endo |
| 7,191,681 B2 | 3/2007 | Sato |
| 7,191,682 B2 | 3/2007 | Sando |
| 7,195,091 B2 | 3/2007 | Rixon |
| 7,201,082 B2 | 4/2007 | Yamada |
| 7,219,576 B2 | 5/2007 | Leonard et al. |
| 7,267,194 B2 | 9/2007 | Miyoshi |
| 7,275,614 B2 | 10/2007 | Hayashi |
| 7,409,889 B2 | 8/2008 | Hurwic et al. |
| 7,441,478 B2 | 10/2008 | Burgstaler et al. |
| 7,497,144 B2 | 3/2009 | Yoon |
| 7,665,565 B2 | 2/2010 | Tokumo et al. |
| 7,730,989 B2 | 6/2010 | Canals Riba et al. |
| 7,775,555 B2 | 8/2010 | Allen et al. |
| 7,987,743 B2 | 8/2011 | Sukonthapanich |
| 8,196,695 B2 | 6/2012 | Kim et al. |
| 8,276,478 B2 | 10/2012 | Tokumo et al. |
| 8,973,462 B2 * | 3/2015 | Olajos ................... G05G 1/327 74/512 |
| 9,523,998 B2 * | 12/2016 | Sukonthapanich .... G05G 1/327 |
| 2001/0006010 A1 | 7/2001 | Choi |
| 2001/0027696 A1 | 10/2001 | Mizuma |
| 2002/0007693 A1 | 1/2002 | Mueller |
| 2002/0078783 A1 | 6/2002 | Bang |
| 2002/0088303 A1 | 7/2002 | Hayashihara et al. |
| 2002/0174739 A1 | 11/2002 | Cordero |
| 2002/0184962 A1 | 12/2002 | Saitou |
| 2002/0189391 A1 | 12/2002 | Matsumoto |
| 2003/0075005 A1 | 4/2003 | Schiel |
| 2003/0106392 A1 | 6/2003 | Willemsen |
| 2003/0140726 A1 | 7/2003 | Burgstaler |
| 2004/0003674 A1 | 1/2004 | Endo |
| 2004/0211286 A1 | 10/2004 | Schwerdt |
| 2004/0231453 A1 | 11/2004 | Harashima |
| 2005/0044982 A1 | 3/2005 | Hayashi |
| 2005/0050980 A1 | 3/2005 | Park |
| 2005/0103151 A1 | 5/2005 | Yoon |
| 2005/0188781 A1 | 9/2005 | Suzuki |
| 2005/0229738 A1 | 10/2005 | Podkopayev |
| 2005/0241432 A1 | 11/2005 | Burgstaler |
| 2005/0247157 A1 | 11/2005 | Jasseron |
| 2005/0275204 A1 | 12/2005 | Noh |
| 2006/0053948 A1 | 3/2006 | Mahendra et al. |
| 2006/0070487 A1 | 4/2006 | Hayashi |
| 2007/0068321 A1 | 3/2007 | Song |
| 2007/0137394 A1 | 6/2007 | Park |
| 2007/0175692 A1 | 8/2007 | Hasegawa |
| 2007/0266815 A1 | 11/2007 | Johansson |
| 2008/0047386 A1 | 2/2008 | Ridgway |
| 2008/0053265 A1 | 3/2008 | Bannon |
| 2009/0250285 A1 * | 10/2009 | Allen ................... B60K 23/02 180/274 |
| 2014/0260766 A1 | 9/2014 | Sukonthapanich |

FOREIGN PATENT DOCUMENTS

| | | | |
|---|---|---|---|
| EP | 0 433 702 A2 | 6/1991 | |
| EP | 0 659 615 A1 | 6/1995 | |
| EP | 0 873 923 | 10/1998 | |
| EP | 0 928 726 | 7/1999 | |
| EP | 1 074 445 A2 | 2/2001 | |
| EP | 1 323 602 A1 | 7/2003 | |
| EP | 1 582 419 | 10/2005 | |
| EP | 2322396 A2 * | 5/2011 | ............... B60T 7/06 |
| EP | 2 540 579 A1 | 1/2013 | |
| ES | 2 244 328 A1 | 12/2005 | |
| ES | 2 298 019 A1 | 5/2008 | |
| ES | 2 320 515 A1 | 5/2009 | |
| ES | 2 327 192 A1 | 10/2009 | |
| ES | 2 378 869 A1 | 4/2012 | |
| ES | 2 397 378 A1 | 3/2013 | |
| FR | 2 841 011 | 12/2003 | |
| GB | 2 244 324 A | 11/1991 | |
| JP | 2000-313319 A | 11/2000 | |
| WO | WO 2013/11159 A1 | 1/2013 | |

OTHER PUBLICATIONS

Spanish Search Report and Written Opinion dated Jan. 26, 2016 for Appln. No. P201530200.

* cited by examiner

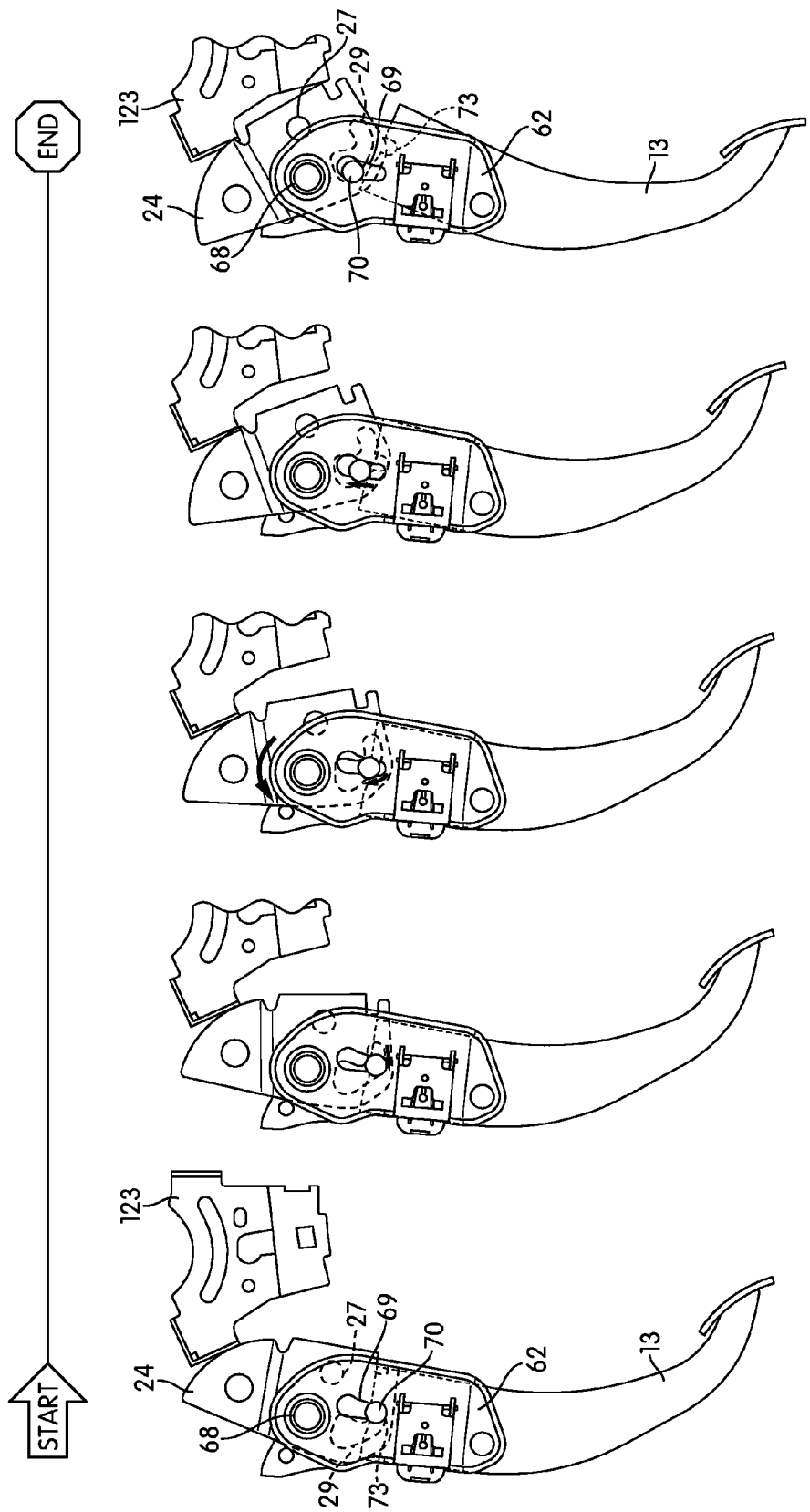

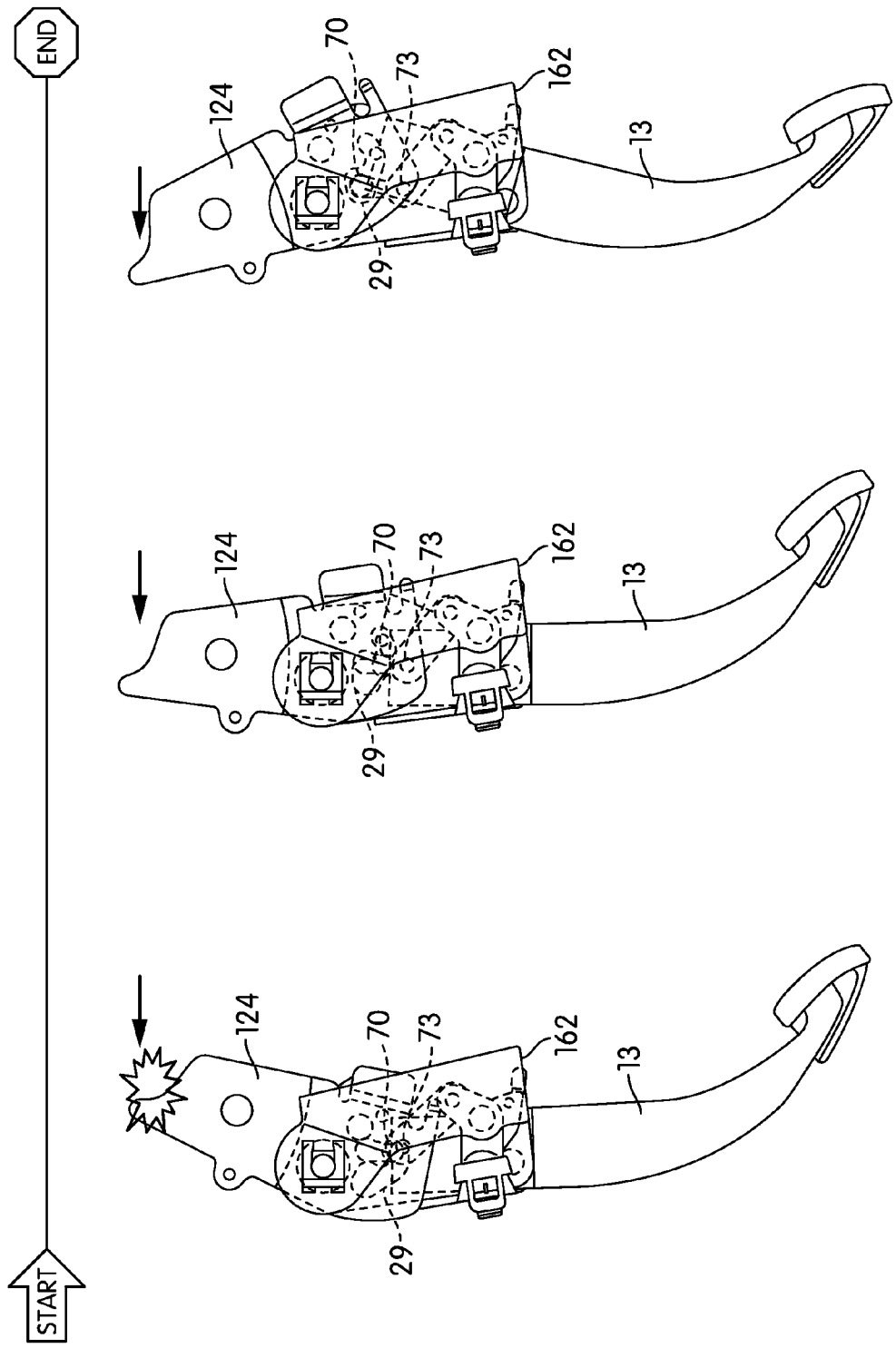

VARIABLE RATIO BRAKE PEDAL

BACKGROUND

Field of Invention

The present invention is generally related to a pedal assembly of a vehicle, and, more particularly, variable ratio actuating assemblies for vehicles, such as brake pedal assemblies having a variable pedal ratio.

Description of Related Art

A pedal, such as a brake pedal, is mounted to a dash panel in a vehicle so as to provide a driver easy access and manipulation via his/her foot. For example, known brake pedal assemblies include a pedal arm having one end that is pivotally mounted to a mounting structure (e.g., a bracket) provided in the vehicle to enable pivotal movement of the pedal arm about an operating pivot axis. The pedal arm includes an input connector in the form of a booster pin. This booster pin operatively connects to a master cylinder or brake booster push rod that is configured to actuate the master cylinder of the vehicle brake system for purposes of selectively engaging or disengaging the vehicle's brakes. The booster pin is positioned between the operating pivot axis of the pedal arm and a pedal foot pad at an end of the pedal arm opposite the end of the operating pivot axis.

The feel and effectiveness of the braking action experienced by the operator can be varied by changing the geometric pedal ratio, which refers to the geometric relationship between the levers and pivot points that make up the brake pedal assembly. This geometric ratio is related to the pedal's force ratio $F_B/F_A$, where $F_A$ is the amount of force applied to the input portion (e.g., the pedal pad) and $F_B$ is the amount of force applied to the input element (e.g., the brake booster rod). The geometric pedal ratio for a fixed relationship between levers is typically expressed as R=a/b, where a is the distance between the operating pivot axis and the actuation point on the pedal foot pad, and b is the distance between the operating pivot axis and the master cylinder push rod attachment point, i.e., the booster pin. In general, for a given pedal arm travel at a given input force, pedal assemblies with higher geometric pedal ratios generate greater forces that are applied to the brake system. However, the higher pedal ratio results in a shorter travel of the master cylinder push rod. Additionally, the higher pedal ratio affects the "pedal feel" in the braking action to the user, thus altering the operator's perception of comfort or reasonable operation.

Variable ratio brake pedal assemblies are known in the art. For example, see U.S. Patent Application Publication No. 2003/0106392 and U.S. Pat. Nos. 4,615,235 and 7,219,576. However, these variable ratio brake pedal assemblies include complex linkage mechanisms. Mechanisms with long linkages tend to give a continuously increasing curve for variable ratio, which is not desirable as the driver can experience push back while the brake is released. Prior designs also have a high degree of movement (e.g., up to 40 mm). Mechanisms with shorter linkages may provide better performance curves, but they tend to interfere with packaging of the pedal mechanism/foot controls below the instrumental panel, particularly when users with large shoes or work boots are activating the controls. Mechanisms with cam designs are prone to wear and noise performance issues.

SUMMARY

One aspect of the invention provides a variable ratio pedal assembly for operating a push rod that activates a functional system of a vehicle. The pedal assembly includes a pedal arm having an elongated lever structure with a first end and a second end; a pedal plate provided on the second end of the elongated lever structure of the pedal arm for depression by a foot of a driver; a vehicle mounting bracket; a pivot tube configured for pivoting relative to the vehicle mounting bracket; at least one activation link, an input link, and an intermediate link. A first end of the at least one activation link is connected to the pivot tube for pivoting therewith and a second end of the at least one activation link is connected to the elongated lever structure of the pedal arm. The input link connects to a push rod that activates the functional system of the vehicle and is operatively connected to the activation link. A first end of the intermediate link is pivotally connected to the input link and a second end of the intermediate link is pivotally connected to the vehicle bracket. Pivotal movement of the pedal arm is configured to pivotally move the pivot tube relative to the vehicle mounting bracket via the activation link. The pivotal movement of the pivot tube is configured to actuate movement of the input link to enable pushing of the push rod as a result of pivoting of the pedal arm. The movement of the input link is configured to actuate pivotal movement of the intermediate link relative to the input link and the vehicle bracket, resulting in a variation in angle between the input link and the intermediate link. The variation in angle between the input link and the intermediate link creates a ratio that varies as the pedal arm is moved.

Another aspect of the invention provides a vehicle having a variable ratio pedal assembly. The variable ratio pedal assembly includes a pedal arm having an elongated lever structure with a first end and a second end; a pedal plate provided on the second end of the elongated lever structure of the pedal arm for depression by a foot of a driver; a vehicle mounting bracket; a pivot tube configured for pivoting relative to the vehicle mounting bracket; at least one activation link, an input link, and an intermediate link. A first end of the at least one activation link is connected to the pivot tube for pivoting therewith and a second end of the at least one activation link is connected to the elongated lever structure of the pedal arm. The input link connects to a push rod that activates the functional system of the vehicle and is operatively connected to the activation link. A first end of the intermediate link is pivotally connected to the input link and a second end of the intermediate link is pivotally connected to the vehicle bracket. Pivotal movement of the pedal arm is configured to pivotally move the pivot tube relative to the vehicle mounting bracket via the activation link. The pivotal movement of the pivot tube is configured to actuate movement of the input link to enable pushing of the push rod as a result of pivoting of the pedal arm. The movement of the input link is configured to actuate pivotal movement of the intermediate link relative to the input link and the vehicle bracket, resulting in a variation in angle between the input link and the intermediate link. The variation in angle between the input link and the intermediate link creates a ratio that varies as the pedal arm is moved.

Other features and advantages of the present invention will become apparent from the following detailed description, the accompanying drawings, and the appended claims.

BRIEF DESCRIPTION OF THE DRAWINGS

FIGS. 9A-9E show a side views of parts of a variable ratio pedal assembly, in accordance with an embodiment as shown in FIGS. 1-4, illustrating actuation of a release mechanism of the pedal assembly upon a collision and movement of a release lever by an actuation mechanism.

FIGS. 10A-10C show a side views of parts of a variable ratio pedal assembly, in accordance with an embodiment as shown in FIGS. 5-8, illustrating actuation of a release mechanism of the pedal assembly upon a collision and movement of a release lever by an actuation mechanism.

DETAILED DESCRIPTION OF THE PREFERRED EMBODIMENT(S)

The herein disclosed pedal assembly has linkage arrangement to create a variable force output in a brake pedal, for example. The combination and arrangement of links are such that they are well above the output link, in order to avoid any interference with a user manipulating the pedal or controls (e.g., contact with large size work boots).

Further, in an embodiment, the geometry and shape of the parts are such that, in the event of a crash, a release lever is struck by an actuation mechanism (e.g., bracket) mounted to the vehicle's structure adjacent the release lever. The reaction bracket will then cause the release lever to rotate and disconnect the pedal parts from the pushrod. Specifically, as described in greater detail below, the release lever is capable of movement from a first position to a second position during vehicle collision. Upon rotation to its second position, the release lever disconnects the elongated lever structure of the pedal arm by forcing release of the elongated pedal structure from the activation link(s), thus disconnecting any translational movement between the pushrod and pedal arm. Disconnection of the pedal assembly reduces and/or prevents energy from being transmitted to the driver's foot, thereby reducing injury to the driver.

Figure 1:
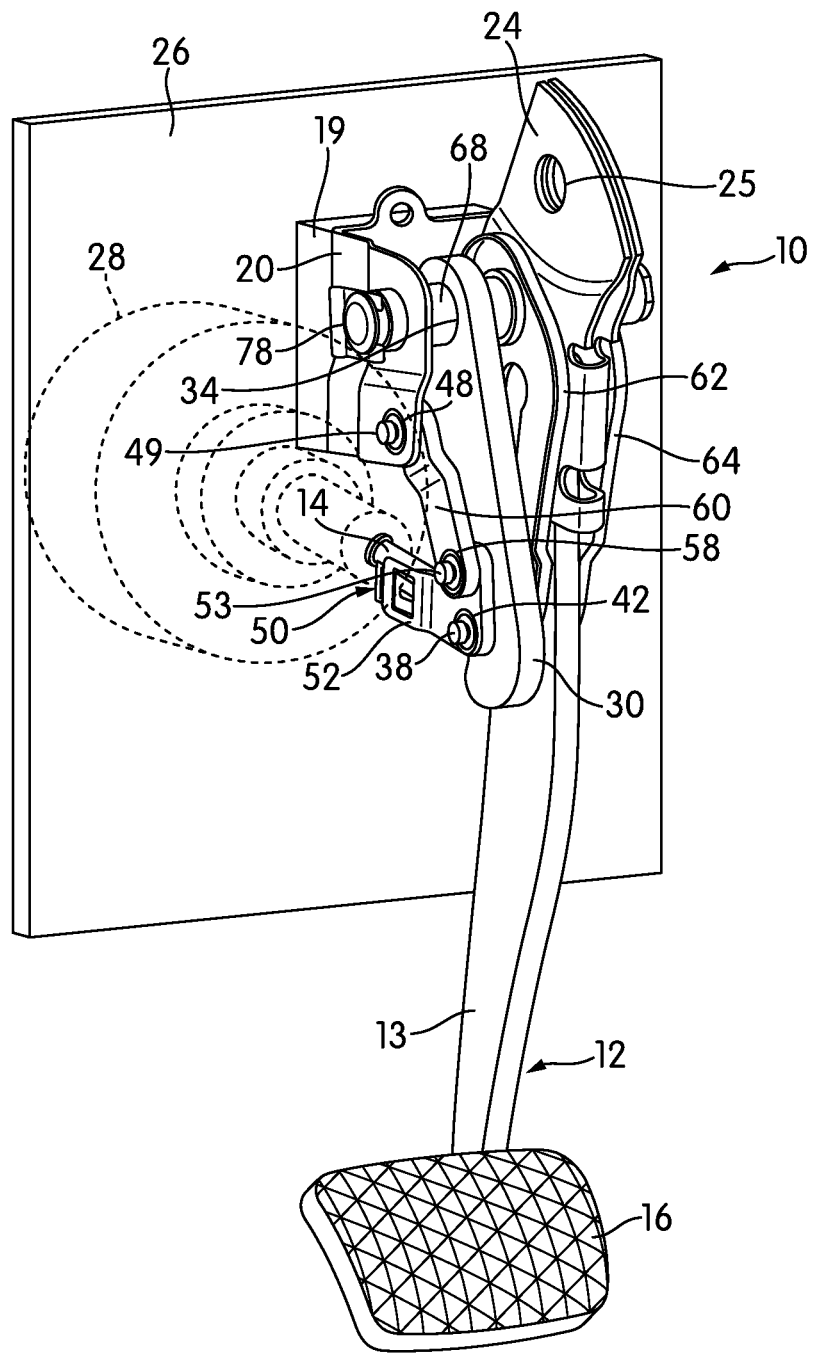
FIG. 1 illustrates a left perspective view of a variable ratio pedal assembly mounted in a vehicle in accordance with an embodiment of the present invention.

FIG. 1 illustrates a perspective view of an actuating assembly 10 in accordance with an embodiment of the present invention. The actuating assembly 10 as described herein is designed to produce and apply a varying ratio of force to a functional system, e.g., brake booster, as compared to the pedal movement. In the illustrated embodiment, the actuating assembly 10 is in the form of a pedal assembly or "pedal", and particularly a brake pedal assembly for a vehicle. The brake pedal assembly 10 may be of the adjustable-type or the conventional non-adjustable type. However, the assembly 10 may be a parking brake pedal assembly or any other lever assembly having a lever for which a variable pedal ratio is desired.

Further, it is designed such that its assembly or structure disengages or disconnects from a part of the vehicle in the event of impact, crash or collision, such as with another object. For simplicity purposes only, such events will be referred to herein as "incidents." Of course, the term incidents should not be limiting, and should be understood to include impact with an object or another vehicle in which forces are great enough to cause injury to a driver or user of a vehicle. More specifically, during an incident, the pedal 10 may be released for movement with respect to a vehicle structure, so that, upon compression of the vehicle structure and forced movement of its parts and a front end of the vehicle, injury to a driver is reduced. Energy is prevented from being transmitted to the foot of the driver, thereby reducing injury to the driver. Injury or damage to the driver's body, particularly one's lower extremities including ankles or knees, may be caused by movement of the vehicle parts and/or movement of the driver as a result of the forces caused by the incident. For example, the driver or user may be forced via inertia in a forward direction toward a vehicle's instrument panel and/or dash board (i.e., because in a front end crash the remainder of the vehicle can travel forward as the front end is crushed). Additionally, during an incident, injury to a driver may be exacerbated, particularly when the pedal 10 is a brake pedal, and the brake push rod may be driven relatively rearwardly to force the pedal against the driver's lower extremity during the incident. That is, because of the natural tendency for the driver to be pressing down on the pedal to apply the brakes to the vehicle, the driver may be subjected to greater injury as a result of the forces and relative movement of the pedal, vehicle parts, and himself/herself caused by the incident. Thus, the decoupling or disconnecting of the parts of the pedal assembly 10 as herein described thereby aims to substantially reduce or eliminate such injury or damage by releasing at least a part of the pedal's mounting location.

Generally speaking, the terms "pedal", "pedal assembly", or "pedal structure" used interchangeably throughout this specification are not intended to be limit to a specific type of pedal device. It can be used for a brake pedal, in which case it varies the ratio of the pedal to a brake booster. The pedal may be used with any functional system (e.g., mechanical or electro-mechanical system such as a brake system, transmission) of the vehicle. The method(s) of manufacturing parts of the pedals disclosed herein are not intended to be limiting, and may include single processes and/or secondary processes. For example, parts of the disclosed pedal assembly may be manufactured or formed via stamping, molding, piercing, punching, bending, and/or manual processes. Also, the materials used to manufacture the pedal assembly should not be limiting. The pedal and its parts could be made from one or more metal(s) such as steel (tubular or blade-type), or plastic materials, for example. The parts of the pedal assembly could also be made from a combination of such materials, e.g., both metal and plastic.

Referring now more particularly to the drawings, the pedal assembly 10, shown in FIG. 1, is a brake pedal 10 connected to a brake booster 28. For explanatory purposes only, the pedal 10 is described with reference to a braking system, but should not be limited to such. As noted above, the pedal assembly 10 may be also connected to parts of a clutch assembly, for example. The pedal assembly 10 is provided in the vehicle such that it is easily accessible for depression by a foot of a driver. For example, in some cases, the pedal assembly 10 is mounted in relation to panels of a dashboard 36 and/or an instrument panel (IP). The dashboard 36 of the vehicle, also referred to as the "dash", may comprise an upper panel and a lower panel that are connected to each other (e.g., using methods or devices known in the art). In some embodiments, the upper dash panel and lower dash panel may comprise a uniform or single piece. The panels are generally connected to a plurality of devices of the vehicle. For example, the dash 36 may be connected to another vehicle structure 26, sometimes referred to as a front of dash (on a lower side or underside) or a firewall. A brake booster 28 of the brake system is fixed to the front of the dash panel or firewall 26 and to brake pedal 10 via a push rod 14 (described in detail below).

The pedal assembly 10 comprises a pedal arm 12. Pedal arm 12 has an elongated lever structure 13 that is configured to be pivotally mounted, e.g., at or near a first end or along the structure, and has a pedal plate 16 provided on (or attached to) its second or distal end via connecting device 15. In some embodiments, the elongated lever structure 13 may be pivotally connected to a pedal bracket 20 via a pin or shaft 66. Pedal bracket 20 may optionally be a vehicle mounting bracket used for mounting to the vehicle structure 26, using fasteners within its holes 21, and/or in cooperation with other brackets or block mounts, such as block mount 19, for connecting the pedal arm 12 to the vehicle. Of course, the devices used for mounting and their design are not meant to be limiting; thus, alternate designs and assemblies for connecting a pedal to a vehicle may be used and would not be considered beyond the scope of the present disclosure. Also, the shape and design of the pedal arm 12 is not intended to be limiting. For example, in embodiments, the pedal arm 12 can be a solid structure, a tubular structure, or include a channel in and/or along its structure (e.g., a "U"-channel shape). Other designs, mountings, and structure shapes could be implemented in the herein disclosed pedal assembly without departing from this disclosure, as would be understood to one of ordinary skill in the art.

Figure 4:
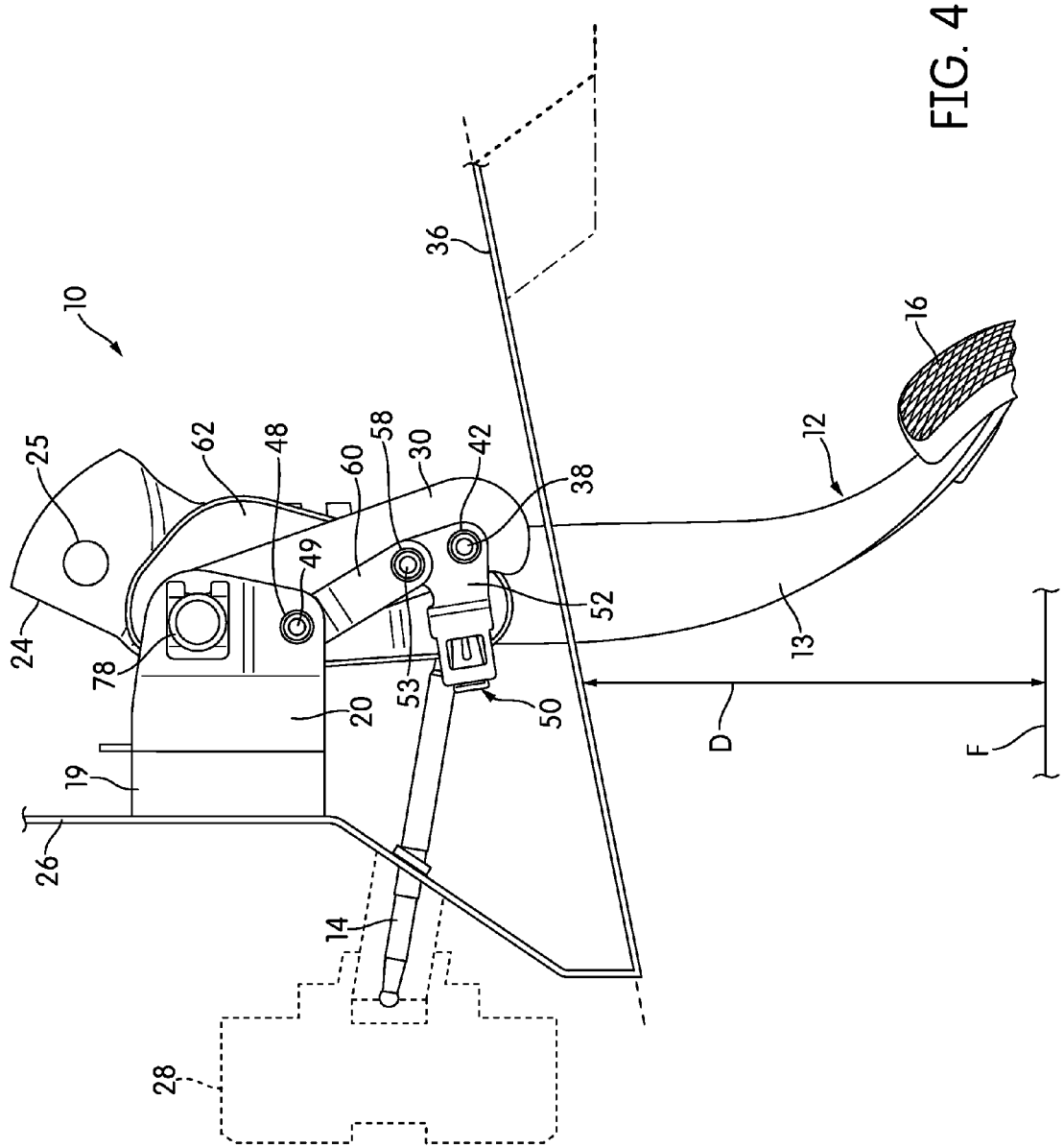
FIG. 4 shows a side view of the pedal structure of FIG. 1.

Referring to FIG. 4, the pedal bracket 20 may be connected at a first end to a block mount 19 (e.g., to provide a space between the two and position the pedal arm 12 within the vehicle). The block mount 19 is connected to part of vehicle structure 26. Block mount 19 and/or pedal bracket 20 may be connected to panels of the vehicle (or the dash, in general) using conventional fastening devices such as nuts and bolts, or by other methods such as welding. As such, the mounting of the block mount 19 and/or pedal bracket 20 to the vehicle is not meant to be limiting. In addition to mounting the pedal assembly 10, the pedal bracket 20 may act as a casing surrounding at least a portion of the links of the pedal assembly and is configured to limit movement of a least one activation link if/when the elongated lever structure of the pedal is disconnected. Additional details of the disconnection of pedal parts are described further below.

In an embodiment, the pedal arm 12 is a brake pedal arm for operating an input element (e.g., push rod) connected to a brake booster 28 of a vehicle.

A cover or reinforcement bracket (not shown) can also be provided and connected to pedal bracket 20 and/or one of the vehicle structures, e.g., structure 36, using a fastener and/or nut assembly. The reinforcement bracket can reinforce the pedal bracket and protect the assembly contained therein.

The pedal plate 16 or part at the second or distal end of the elongated lever structure 13 is accessible by a foot of the driver or user such that an application of force by the driver's or user's foot may be applied thereto. During normal operation, a driver or user of a vehicle may apply force via his foot on the pedal plate 16 to activate a functional system of the vehicle (e.g., brake booster 28 of the brake system). "Normal" operation circumstances as referred to throughout this description is defined by a time during which a vehicle is being operated safely and without incidence of impact such as caused by a crash or collision with another vehicle, person, or object. Thus, in the embodiment being described herein, the force from a driver or user's foot is configured to cooperate with brake booster 28 to translate pivotal motion into a braking force to be applied to the wheels of the vehicle. Such methods for applying a braking force (and the pivotal translation) are known in the art and therefore not discussed in detail herein.

Specifically, the push rod 14 is configured to activate the functional system (e.g., braking device) of the vehicle. The push rod 14 is connected to the brake booster 28 through the vehicle structure 26. The push rod is connected to a spring or similar mechanism inside the brake booster 28, for example. An input link 52 is constructed to be connected to the push rod 14 of the brake booster 28. The push rod 14 translates the pivoting force applied by the foot of the driver as he pushes on the pedal plate 16 to the brake booster 28. The elongate lever structure 13 is connected to an activation link(s) via a transverse pin 70 (described in greater detail below). The first end of the elongated structure 13 can include a receiving slot 73 designed to accommodate the pin 70, for example. Generally, when force is applied to the pedal plate 16 by a foot of a user, the elongated structure 13 is pivoted, which in turn activates the activation link(s) and pushes the push rod 14, and the spring or mechanism of the brake booster 28 is compressed.

Push rod 14, which may comprise a larger portion and a smaller portion, assists in translating an applied force on the pedal plate 16 to the brake booster 28. A pedal arm 12 is not directly connected to an end 17 of the push rod 14 or directly connected to a single link or a bracket that is directly connected to the end 17 of the push rod 14. Rather, the pedal arm 12 is connected to the push rod 14 via a variable ratio assembly that creates a ratio that varies as the pedal arm is moved to activate the push rod 14. The variable ratio assembly includes at least one activation link (e.g., link 62, or link 162, and 64), an optional separate push link 30, and an intermediate link 60. The end 17 of the push rod 14 is generally mounted to a retainer 50 or coupling device of an input link 52 that is connected to either the at least one activation link, the intermediate link 60, or the optional separate push link 30.

In accordance with an embodiment, such as seen in FIG. 4, the linkage of the variable ratio assembly of the pedal may be provided above an underside of the instrument panel 36. Specifically, the links of the activation link, input link, and intermediate link are mounted above an underside of an instrument panel in the vehicle. The optional push link 30 can also be provided above the underside of the instrument panel. In an embodiment, the linkage can also be provided above an underside or lower portion of the dash 36. In accordance with an embodiment, a distance D measured relative to a plane through the pivot point at 22 and the vehicle floor F is used to determine an amount of space below the instrument panel 36 (see FIG. 4) for a user's foot. In an embodiment, for example, this distance D can be between approximately 265 mm to approximately 365 mm, inclusive, and can very along the length of the underside of the instrument panel 36. In order to provide the linkage of the pedal assembly 10 above the dashboard 36, the link and pivot locations of the variable ratio pedal assembly can be measured and determined, and a variable ratio curve is calculated based on these parameters, for example. Such determinations can be used along with the distance D to ensure sufficient room for a user's foot (so that contact is not made with the linkages), as well as for containing the linkages above the underside of the instrument panel and/or dash 36.

Figure 2:
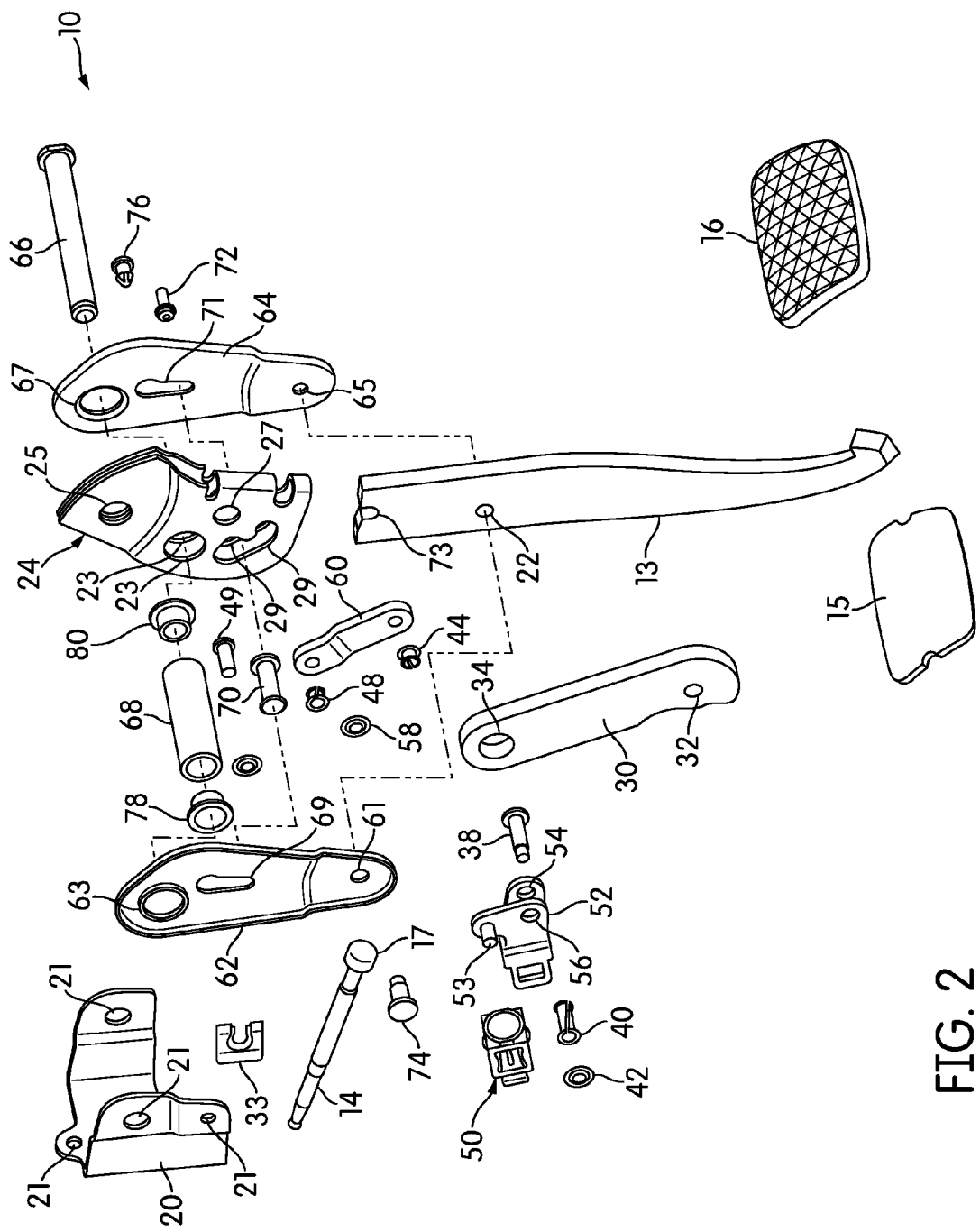
FIG. 2 illustrates an exploded view of the pedal assembly of FIG. 1.

The exploded view of FIG. 2 illustrates each of the parts of the pedal assembly 10 in greater detail, in accordance with an embodiment herein. The elongated lever structure 13 is connected to the activation link (e.g., formed by first and second links 62, 64, as shown in FIG. 2) by insertion of the transverse pin 70 through a slot 69 in the first link 62, through guide slots 29 of a release lever 24, and through a slot 71 in the second link 64. As illustrated in FIG. 2, for example, in an embodiment, pin 70 can be an I-pin whose ends are is inserted and slid into keyhole openings of slot 69 and slot 71 at a top portion thereof. The pin 70 can be slid down into position at a bottom portion of each of the slots 69 and 71 to complete the assembly process and connect the links 62, 64 of the activation link. In an alternate embodiment, pin 70 can be configured such that at least one end of the pin 70 is secured in the slot(s) 69 and/or 71 via a bushing or nut, for example. The pin 70 can be one-piece design or include more than one piece (e.g., a single pin or two (or more) separate pins) for assembly. Alternate designs should be understood by one of ordinary skill in the art. In addition to connecting the noted structures, the pin 70 acts as a slide pin that is moved and guided within parts of the structures during activation of a release mechanism of the pedal assembly 10 (which is described further below).

Figure 5:
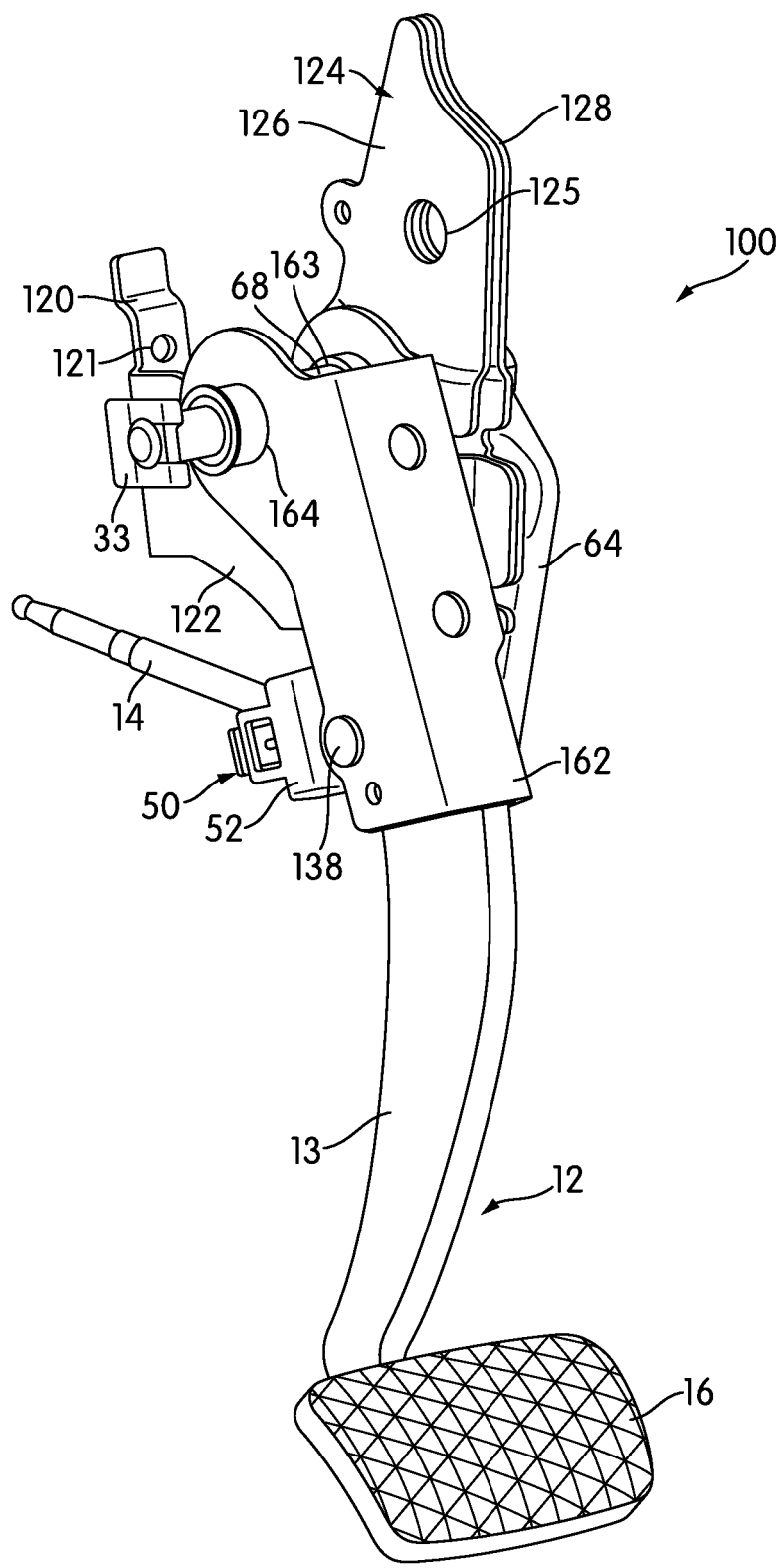
FIG. 5 illustrates a left perspective view of a variable ratio pedal assembly for mounting in a vehicle in accordance with another embodiment of the present invention.
Figure 6:
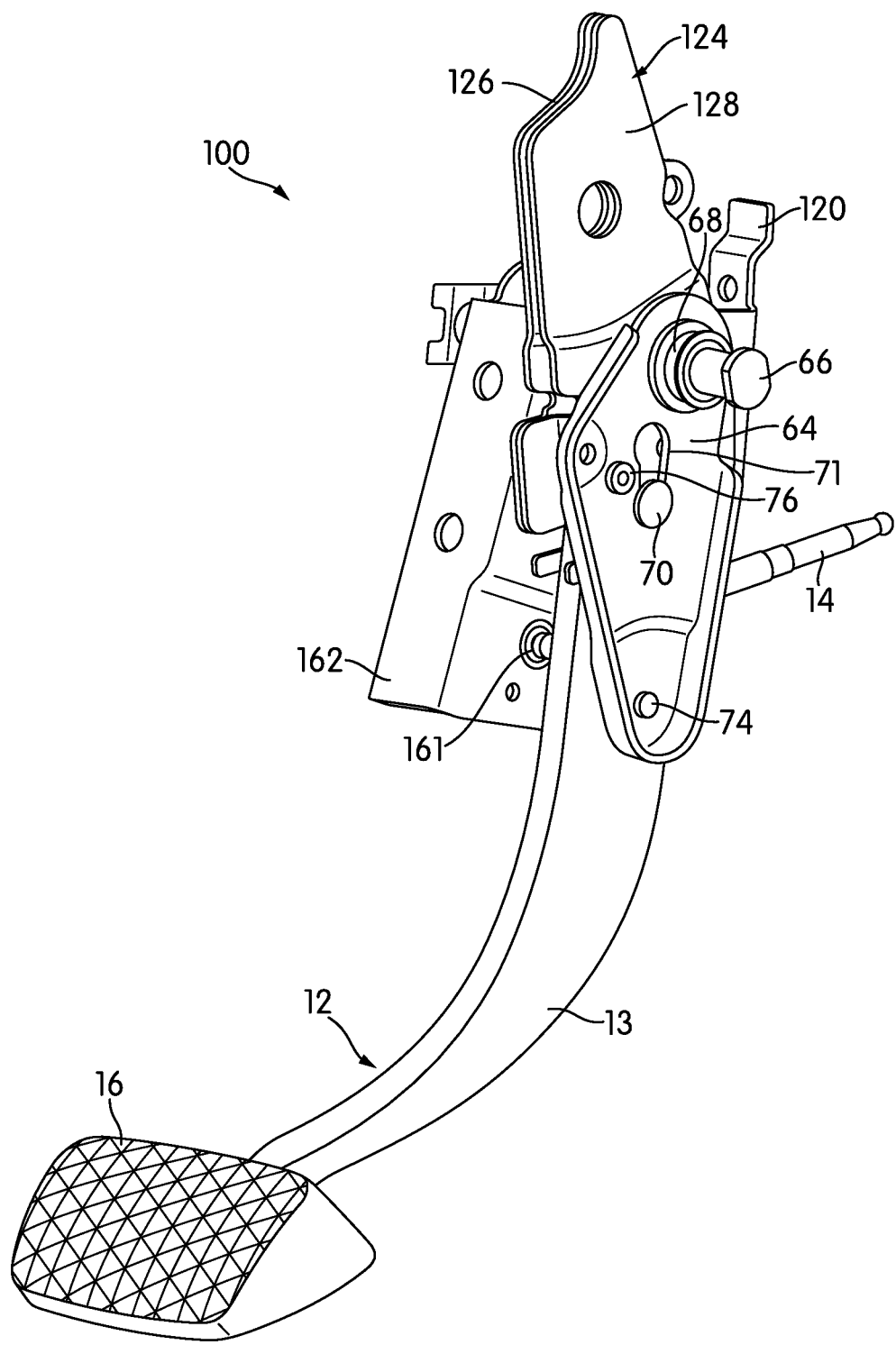
FIG. 6 illustrates a right perspective view of the pedal assembly of FIG. 5 in accordance with an embodiment of the present invention.
Figure 7:
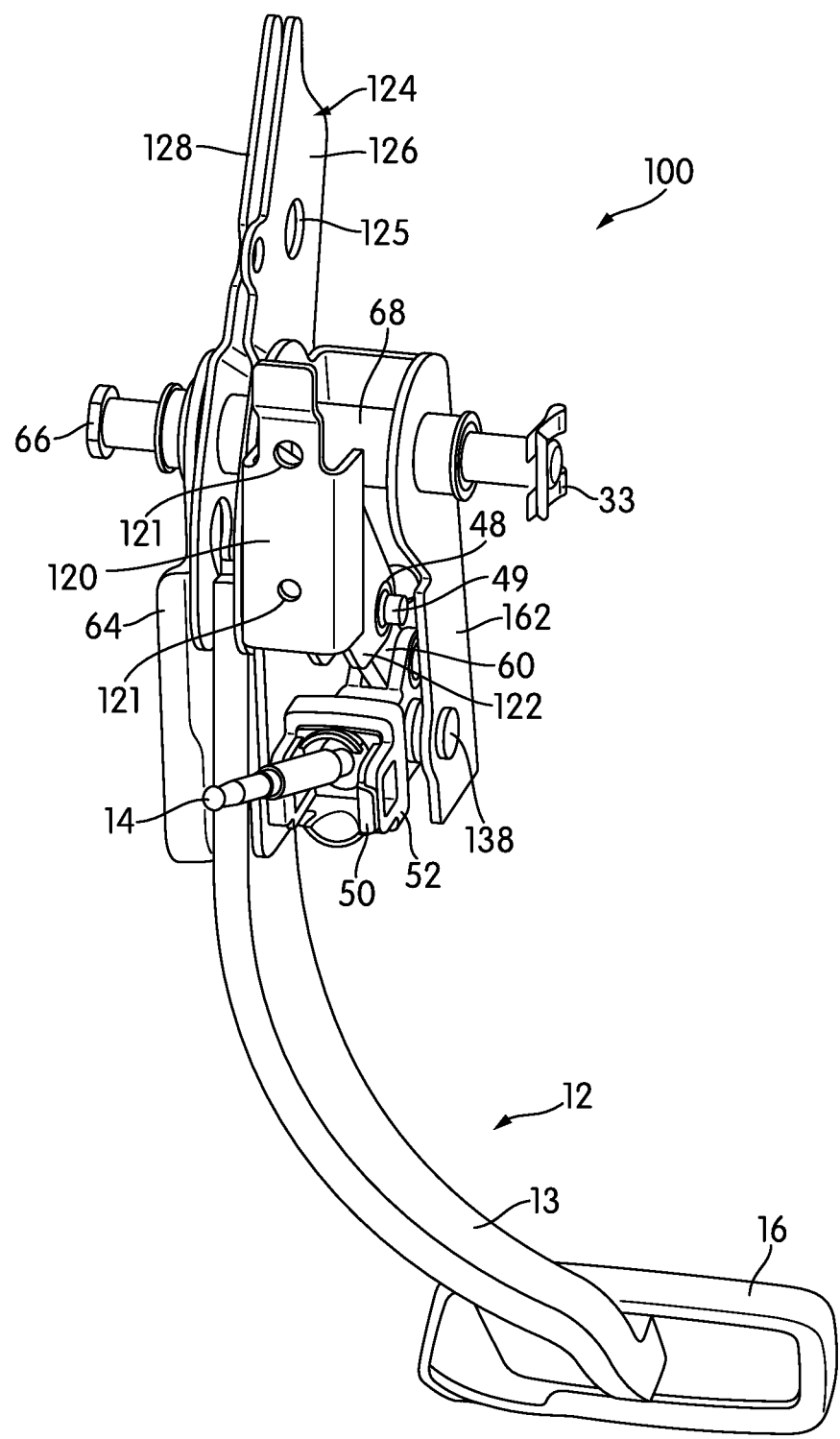
FIG. 7 shows a rear view of the pedal structure of FIG. 5.

The pivot tube 68 is attached to and configured for pivoting relative to the vehicle mounting bracket 20. The at least one activation link is configured to pivot with the pivoting of the pivot tube 68, based on the pivotal movement of the pedal. A first end of the at least one activation link is configured to be connected to a pivot tube 68 or shaft and a second end of the at least one activation link is connected to the elongated lever structure 13 of the pedal arm 12 (e.g. at 22, as shown in FIG. 2). As noted above, in the embodiment illustrated in FIGS. 1-4, the activation link comprises a first link 62 and a second link 64 arranged in a parallel configuration on pivot tube 68. A first end of each of the first and second links 62, 64 of the activation link is connected to the pivot tube 68 for pivoting therewith and a second end of each of the first and second links is connected to the elongated lever structure 13 of the pedal arm 12. In another embodiment, such as shown in FIGS. 5-7, at least a portion of the at least one activation link forms a casing 162 that at least partially surrounds at least a portion of both the input link 52 and the intermediate link 60. Under normal operation, as the pedal arm 12 rotates pivot tube 68 with respect to the dash 36 and vehicle structure 26, the at least a part of the push rod 14 is moved to apply a braking force.

A brake actuation sensor pin 72 is provided to connect the pedal assembly 10 to a brake actuation sensor (BAS). The pin 72 engages with the BAS, causing it to rotate upon rotation of the pivot tube 68 and activation link(s), and through the electronics of a potentiometer, it switches (ON/OFF) the brake lights and/or cruise control.

Figure 3:
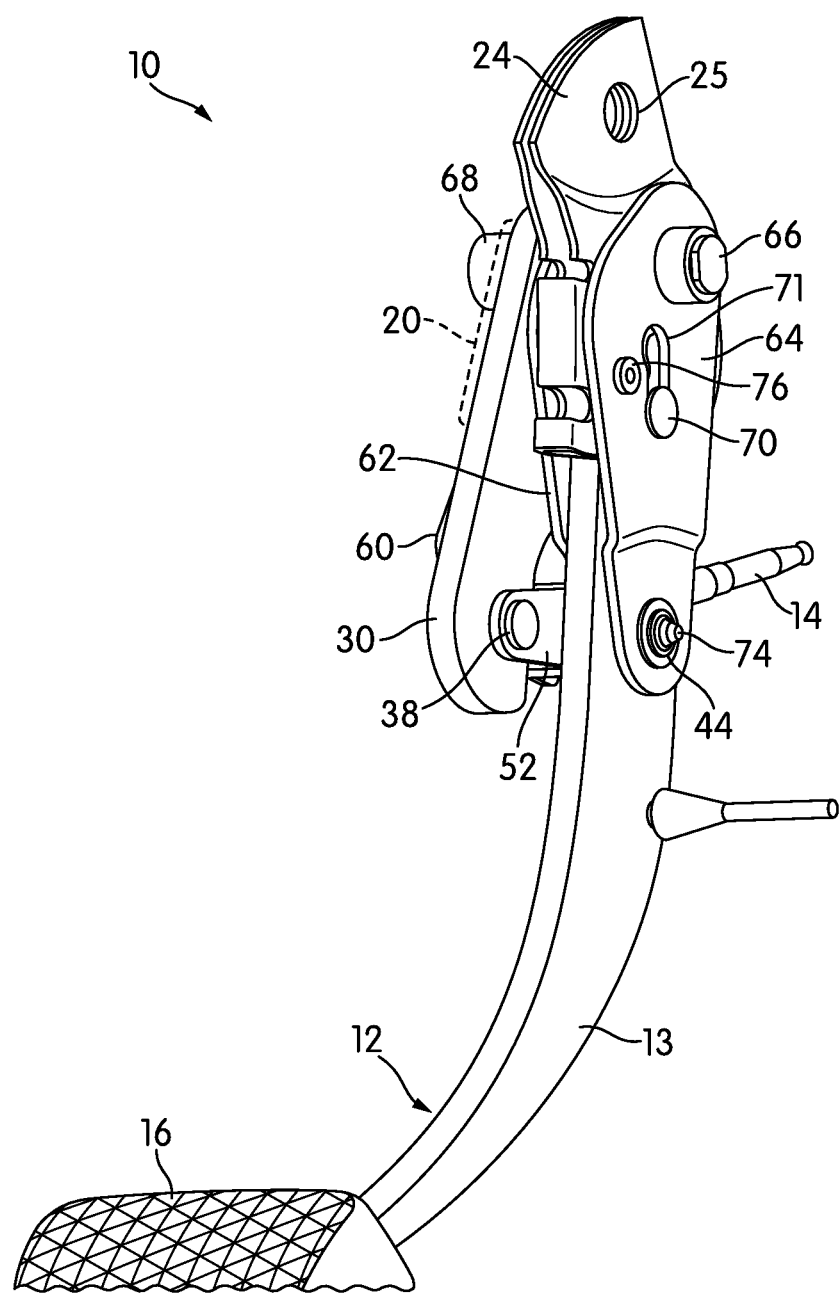
FIG. 3 illustrates a right perspective view of the pedal assembly of FIG. 1 in accordance with an embodiment of the present invention.

A portion of the first end of the elongated lever structure 13 can be yoke-shaped and connected to a release lever 24 of a release mechanism (the release mechanism being explained in detail further below). Each wall of the release lever 24 can include aligned bores 23, holes or openings 25 and 27, and guide slots 29. The bores 23 are configured to receive the pivot tube 68 therethrough. The guide slots 29 are configured to receive the transverse pin 70 therethrough. The release lever 24 is configured to connect the elongated lever structure 13 of the pedal arm 12 with the at least one activation link, e.g., links 62 and 64, via insertion of pin 70 through guide slots 29 of the release lever 24 and in the elongated lever structure 13 (e.g., through receiving slot 73). The connection of the release lever 24 to the elongate lever structure 13 allows the activation links 62 and 64 to move with the pivoting of the elongate lever structure 13 in a first pivotal direction during normal operation to actuate movement of the input link 52. The release lever 24 remains in a first position during the pivoting of the pedal arm 12 in a first direction and with the pivotal movement of the pivot tube 68 during an operation to actuate movement of the input link 52. In an embodiment, a shear pin 76 can be attached through a portion of the activation link(s) and into the release lever 24 (e.g., through link 64 and into a portion of the release lever 24, as shown in FIG. 3). The shear pin 76 prevents rotation of the crash release lever 24 during assembly, for example, and the release lever 24 remains in its first position. Thus, under normal operation and circumstances, depression of the pedal 16 causes the elongated lever structure 13 to induce motion (pivotal rotation) to the pivot tube 68, while the release lever 24 maintains its position in the first position and does not move (the pivot tube 68 thus pivoting relative to the release lever 24 within its aligned bores 23).

In an embodiment, the release lever 24 is configured to substantially enclose at least a portion of the first end of the elongated lever structure 13 during normal operation. For example, the first end of the elongated structure that includes the receiving slot 73 can be inserted up into a slot formed by parallel, opposing walls of the release lever 24.

As shown in greater detail in FIG. 2, the elongated lever structure 13 is also connected at opening 22 to the first and second links 62, 64 of the activation link by insertion of a pin 74 through a hole 61 at the second end of first link 62, through opening 22, and through a hole 65 at the second end of second link 64. An end of the pin 74 can be secured via bushing 44. Each of the first and second links 62, 64 also includes a slot 69, 71, respectively, for receipt of transverse pin 70 therethrough, as previously noted. As seen in FIG. 9A, under normal operation, the transverse pin 70 sits in the receiving slot 73 of the elongated lever structure 13, at the bottom of slots 69 and 71 of the links 62, 64, and at a forward portion of guide slots 29 of the release lever 24. As illustrated in FIGS. 9A-9E and explained in detail later, when a release mechanism is activated, the transverse pin 70 is guided in and slides along the slots 69, 71 and guide slots 29 of the lever and out of the receiving slot 73 of the elongate lever structure 13 so that pedal arm 12 disconnects from the lever 24. The elongated lever structure 13 is then capable of and configured to rotate on pin 74.

The links 62, 64 can be operatively attached to one another and connected to the pivot tube 68 at their first ends. Pivot tube 68 can be inserted through and welded to holes 63 and 67 of the links 62 and 64. The pivot tube 68 has an opening or center bore therethrough for receipt of bushing portions 78 and 80 that contain a pivoting axle 66. The bushings 78 and 80 can be connected to the ends of the pivot tube 68. The pivoting axle 66 can be inserted through the connected pivot tube 68 and bushings 78, 80. For example, as shown in FIG. 2, the pivoting axle 66 can be inserted through bushing 80 into and through the center bore of the pivot tube 68 when it is attached or welded to the links 62, 64, for example. An end of the pivoting axle 66 can extend through the bushing 78 for securement via a fastener 33, e.g., a spring clip.

Accordingly, when assembled, the first and second links 62, 64 are secured relative to the pivot tube 68 (e.g., welded). Pivotal movement of the pedal arm 12 pivotally moves the pivot tube 68 relative to the vehicle mounting bracket 20, thus pivotally moving the links 62, 64 of the activation link. The activation link is thus configured to pivot or rotate with the pivot tube 68 upon any pivoting movement of the elongate lever structure 13 of the pedal 12.

The pivoting of pivot tube 68 in turn activates movement of the other links in the variable ratio link assembly. The pivotal movement of the pivot tube 68 is configured to actuate movement of the input link 52 that is connected to the push rod 14 that activates the functional system (mechanical or electro-mechanical) of the vehicle. In the illustrated embodiments, the input link 52 can also be referred to as a booster receiver link, as it connects the brake booster 28, push rod 14, and pedal assembly 10.

The input link 52 has a retainer 50 or coupling device designed for coupling with the end 17 of the push rod 14 to transmit the rotational movement of the pedal arm 12 to the functional system by enabling pushing of the push rod 14. Retainer 50 is a quick-fit connector or bracket, for example. Retainer 50 is shaped to receive the end 17 of the push rod 14 for mounting therein, so that pivotal force from the rotation of activation link(s) and intermediate link(s) about pivot shaft 68 is translated to move push rod 14. In an embodiment, such as shown in FIG. 2, the push rod end 17 comprises a substantially round or circular shape. The shape of the end 17 assists in providing a cooperative connection with the retainer 50 and a smooth release of the push rod 14 during an incident. In an embodiment, retainer 50 comprises a cutout or receiving area to accept the substantially round end portion 17 of the push rod 14. In an embodiment, the receiving area comprises inner walls whose surfaces are shaped or contoured to correspond to the shape of the push rod end 17. The substantially circular or rounded end 17 and the inner walls assist in providing a secure connection that does not require permanent fastening devices. Generally, retainer 50 is configured to receive and lock the end portion 17 of the push rod 14 therein.

The input link 52 is operatively connected to the activation link or links (62, 64) via at least an intermediate link 60. More specifically, the input link 52 is configured to connect the push rod 14 to intermediate link 60 to enable and vary pushing of the push rod 14 (via pivotal movement of the intermediate link 60 relative to vehicle bracket 20) as a result of pivoting of the pedal arm 12 and pivot tube 68. As shown in FIGS. 1 and 4, for example, a first end of the intermediate link 60 is pivotally connected to the input link 52 and a second end of the intermediate link is pivotally connected to an end of the vehicle bracket 20. The intermediate link 60 is a secondary link that is configured to provide a variable ratio of braking force, e.g., so that the ratio of movement applied to the pedal arm 12 is translated and varied as the pedal is pushed or pivoted and travels towards the dash 36. For example, the variable ratio pedal assembly provides a peak force ratio at a beginning of the braking action, e.g., first 25% or 30% of pedal arm and booster travel, while a remainder of the pedal travel has decreased geometric and force ratios.

A pivot pin 53 on an extension portion of the input link 52, shown in FIG. 2, for example, can be inserted through a hole in the first end of the intermediate link 60 and secured with a bushing 58, while still allowing relative rotational movement of the links 52 and 60. A separate pivot pin 49 can be inserted through a hole in the second end of the intermediate link 60 and a hole 21 in the vehicle bracket 20, and secured with a bushing 48. Intermediate link 60 can pivot relative to the vehicle bracket 20.

Optionally, as shown in FIGS. 1-4, the pedal assembly 10 can include an additional, separate push link 30. As seen in FIG. 2, a first end of the push link 30 can have an opening 34 therein for connection with the pivot tube 68 by inserting the pivot tube 68 through the opening 34 (before attaching it to the vehicle mounting bracket 20) (see FIG. 1). The first end of the push link 30 is rotatably secured relative to the pivot tube 68 after its insertion through opening 34 (e.g., via adhesive or welding) such that it may pivot with the pivotal movement of the pivot tube 68. A second end of the push link 30 is pivotally connected to the input link 52. For example, a second end of the push link 30 can received in the input link 52 (e.g., between leg portions). An opening 32 in the push link 30 can be aligned with openings 54 and 56 in the input link 52 for receipt of a sleeve 40 therethrough. A pin 38 can be inserted through the sleeve 40 and secured via fastener 42 to pivotally secure the links 30 and 52 together.

In operation, when the pivotal movement of the pedal arm 12 pivotally moves the pivot tube 68 relative to the vehicle mounting bracket 20 via the activation link (links 62, 64), the pivotal movement of the pivot tube 68 actuates pivotal movement of the push link 30. The pivotal movement of the push link 30 actuates movement of the input link 52 to enable pushing of the push rod 14. Movement of the input link 52 is configured to actuate pivotal movement of the intermediate link 60 relative to both the input link 52 and the vehicle bracket 20. This results in a variation in angle between the input link 52 and the intermediate link 60. The variation in angle between the input link 52 and the intermediate link 60 creates a ratio that varies as the pedal arm 12 is moved. Accordingly, the ratio of braking force applied from the input link 52 to the push rod 14 is varied.

In accordance with the above structure, at the time of normal (braking) operation, a user or operator depresses pedal plate 16 in forward direction with their foot, rotating the pedal arm 12 with respect to the dash 36 and vehicle structure 26. As shown by arrows in FIG. 4, when stepping force is applied to the pedal plate 16, the pedal arm 12 swings forwardly (clockwise) and rotates about a generally horizontal axis towards the front of the vehicle using the pivot tube 68 and pin 74. The pivoting motion of the pedal arm 12 pivots the second ends of the links 62 and 64 of the actuation link with pivot tube 68 (swings counterclockwise), which in turn moves push link 30. The second end of push link 30 is subsequently moved to cause pivoting of the input link 52 and intermediate link 60 about generally horizontal axes. Specifically, the second end of the push link 30 swings the input link 52 forwardly around pin 38. Concurrently, the intermediate link 60 is pivoted using pivot pin 53 and pivot pin 49 to vary the movement of the input link 52, and thus the ratio of force applied via the push rod 14. The input link 52 is moved in a substantially forward direction. Therefore, the push rod 14 is pushed towards the front of the vehicle to operate the braking system. Generally, when force is applied, the spring or mechanism of the brake booster 28 is compressed. Use of the illustrated variable ratio (braking) structure to push the push rod 14 via links 62, 64, 30, 60, and 52 improves the operational feeling of the pedal and allows for setting the pedal ratio to a desired value.

FIGS. 5-7 illustrate alternate views of another embodiment of a variable ratio pedal assembly 100 in accordance with an embodiment of this disclosure. For simplicity purposes only, similar parts as described and noted above with respect to FIGS. 1-4 have been labeled with the same reference numbers. Accordingly, it should also be understood that the features previously noted above with respect to those parts similarly apply to the embodiment of FIGS. 5-7 and thus are not necessarily repeated here and below. Further, although not specifically shown in FIGS. 5-7, it should be understood that the pedal assembly 100 can be connected to a function system of a vehicle, e.g., that the pedal arm 12 is a brake pedal arm for operating an input element (e.g., push rod 14) connected to a brake booster 28 of a vehicle.

Pedal arm 12 has an elongated lever structure 13 that is configured to be pivotally mounted, e.g., at or near a first end or along the structure, and has a pedal plate 16 provided on (or attached to) its second or distal end via connecting device that is accessible by a foot of driver for depression thereof to activate the braking device of the vehicle, for example. In some embodiments, the elongated lever structure 13 may be pivotally connected to a pedal bracket 120 via a pin or shaft 66. Pedal bracket 120 may optionally be a vehicle mounting bracket used for mounting to the vehicle structure 26, using fasteners within its holes 121, and/or in cooperation with other brackets or block mounts, such as block mount 19, for connecting the pedal arm 12 to the vehicle. Pedal bracket includes parallel walls 122 extending therefrom. Pedal bracket 120 can be connected to the vehicle in a similar manner as previously described with respect to pedal bracket 20, for example, using one or more pins such as pin 131, by connecting to the vehicle dash 26 or 36 or block mount 19. During normal operation, a driver or user of a vehicle may apply force via his foot on the pedal plate 16 to activate a functional system of the vehicle (e.g., brake booster 28 of the brake system). Specifically, the push rod 14 is configured to activate the functional system (e.g., braking device) of the vehicle, as the push rod 14 is connected to the brake booster 28 through the vehicle structure 26. An input link 52 is constructed to be connected to the push rod 14 of the brake booster 28. The push rod 14 translates the pivoting force applied by the foot of the driver as he pushes on the pedal plate 16 to the brake booster 28. The elongate lever structure 13 is connected to an activation link(s) via a transverse pin 70 (described in greater detail below). The first end of the elongated structure 13 can include a receiving slot 73 designed to accommodate the pin 70, for example. Generally, when force is applied to the pedal plate 16 by a foot of a user, the elongated structure 13 is pivoted, which in turn activates the activation link(s) and pushes the push rod 14, and the spring or mechanism of the brake booster 28 is compressed.

Figure 8:
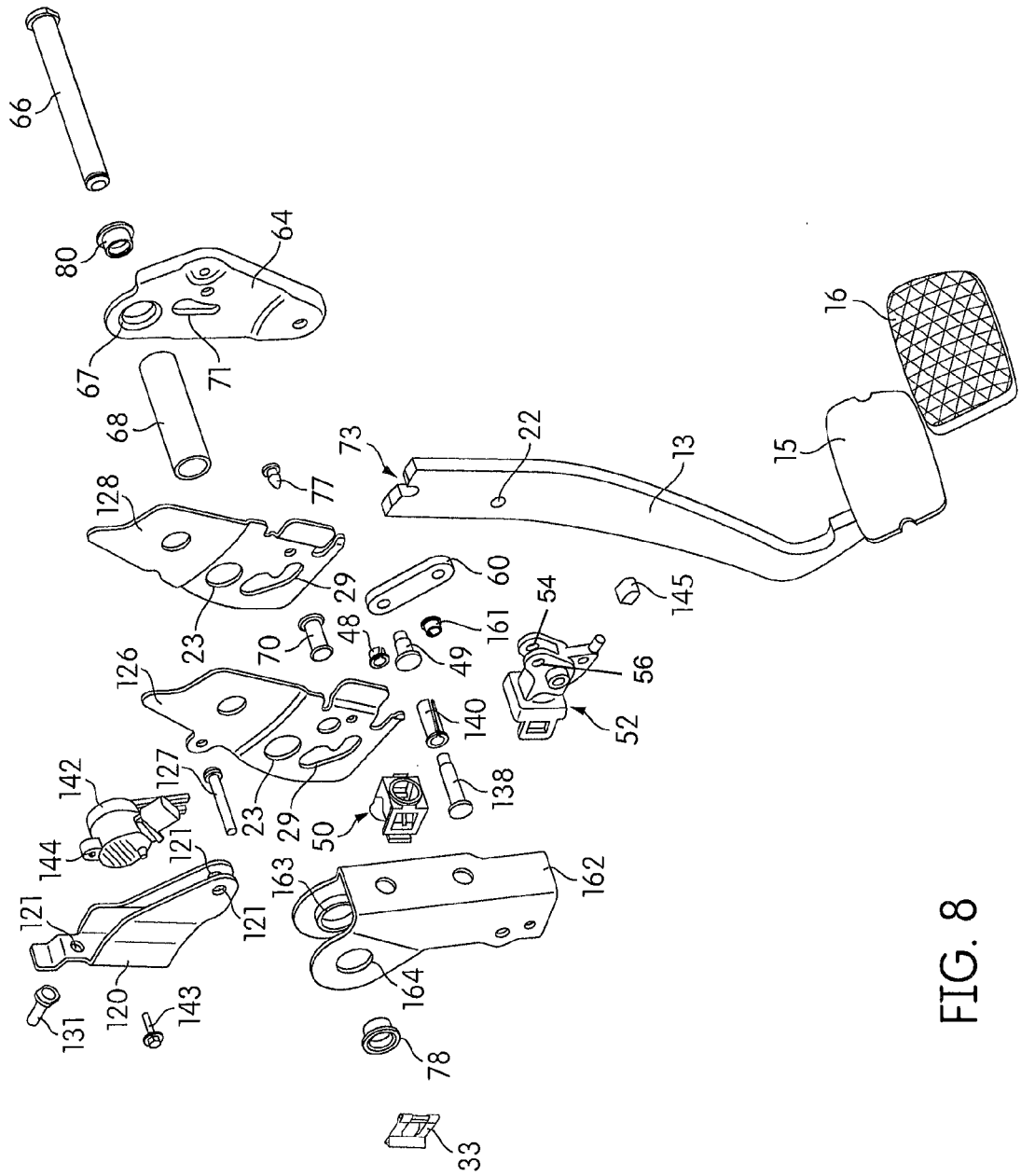
FIG. 8 illustrates an exploded view of the pedal assembly of FIG. 7.

As shown in FIG. 8, in an embodiment, a Brake Apply Sensor (BAS) device 142 is included with pedal assembly 100. Although not shown, it should be understood that such a device or sensor 142 can also be provided on the pedal assembly 10 as shown in FIGS. 1-4. BAS device 142 can be connected to the pedal assembly 100 or vehicle bracket via pins, such via connection of a pin 143 to a mounting portion 144 on the assembly portion of the BAS device 142, for example, as shown in FIG. 8. BAS device 142 engages with a pin 127 and, as the pedal arm 12 rotates, the potentiometer in the sensor/BAS device 142 electronically transmits the position of the brake pedal (e.g., its angle to determine how much is applied) for use by a controller or processor or other device in the vehicle, as understood in the art.

In accordance with an embodiment, such as seen in the embodiment of FIG. 4, the linkage of the variable ratio assembly of the pedal assembly 100 may be provided above an underside of the instrument panel 36 as well. Specifically, the links of the activation link, input link, and intermediate link are mounted above an underside of an instrument panel in the vehicle. In an embodiment, the linkage can also be provided above an underside or lower portion of the dash 36. In accordance with an embodiment, a distance D measured relative to a plane through the pivot point at 22 and the vehicle floor F is used to determine an amount of space below the instrument panel 36 (see FIG. 4) for a user's foot. In an embodiment, for example, this distance D can be between approximately 265 mm to approximately 365 mm, inclusive, and can vary along the length of the underside of the instrument panel 36.

The exploded view of FIG. 8 illustrates each of the parts of the pedal assembly 100 in greater detail, in accordance with an embodiment herein. The pedal arm 12 is connected to the push rod 14 via a variable ratio assembly that creates a ratio that varies as the pedal arm is moved to activate the push rod 14. The variable ratio assembly includes activation links 162 and 64 and an intermediate link 60 enclosed in the activation link 162, as shown in FIGS. 5 and 6. The end 17 of the push rod 14 is generally mounted to a retainer 50 or coupling device of the input link 52 that is connected to the at least one activation link and the intermediate link 60. Specifically, in this embodiment, the at least one activation link 162 forms a casing that at least partially surround at least a portion of both the input link 52 and the intermediate link 60. The casing of activation link 162 comprises two parallel walls that are spaced relative to each other and connected via a front lateral wall, as shown in FIG. 8. The width of the lateral wall or spacing between the two parallel walls of the casing of the activation link 162 can be determined based upon the width of the link(s) designed for receipt or at least partial enclosure therein. The parallel walls include holes 163 and 164 that are axially aligned for receipt of the pivot tube therethrough. The link 162 essentially is a combination of the previously described first link 62 and optional push link 30 that are connected together via a front wall. As seen in FIG. 7, the link 162 of the activation link at least partially encloses an end of the input link 52. Rather than using the optional pivot link 30 as shown in FIG. 1, the intermediate link 60 has a first end that is received in the input link 52 (e.g., between leg portions). An opening in the first end of the intermediate link 60 can be aligned with openings 54 and 56 in the input link 52 for receipt of a pin and/or sleeve therethrough, and secured via a fastener to pivotally secure the links 60 and 52 together.

Also shown in FIG. 8 is a stopper 145 that can be placed on the end/extension of the input link 52. The end/extension of input link 52 is designed to prevent over-rotation during assembly. During normal operation, the end/extension of input link 52 is moved within and close to (if not into contact with) an inside of the activation link 62, and could possibly create some noise. Accordingly, the stopper 145 is provided to reduce and/or avoid production of noise during operation of the linkage and pedal assembly. The stopper 145 can be made of rubber or other cushioning material, for example.

A second end of the intermediate link 60 can be pivotally connected to the vehicle or pedal bracket 120. The second end can be placed between the parallel walls 122, for example. A hole in the second end of the intermediate link can be aligned with holes 121 in the walls 122 of the vehicle/pedal bracket 120. Pivot pin 49 can be inserted through the hole in the second end of the intermediate link 60 and holes 121 in the vehicle/pedal bracket 120, and secured with a bushing 48. Intermediate link 60 can pivot relative to the vehicle/pedal bracket 120.

The input link 52 has a retainer 50 or coupling device designed for coupling with the end 17 of the push rod 14 to transmit the rotational movement of the pedal arm 12 to the functional system by enabling pushing of the push rod 14. Retainer 50 is a quick-fit connector or bracket, for example, shaped to receive the end 17 of the push rod 14 for mounting therein, as previously described. Further, the input link 52 can be connected to the activation link 162 or casing via receipt of a pin 138 through a sleeve 140 and secured via a bushing 161 (see FIG. 8), while still allowing relative rotational movement of the links 52 and 60. Intermediate link 60 can pivot relative to the vehicle bracket 20.

The input link 52 is operatively connected to the activation link or links (162, 64) via at least an intermediate link 60. More specifically, the input link 52 is configured to connect the push rod 14 to intermediate link 60 to enable and vary pushing of the push rod 14 (via pivotal movement of the intermediate link 60 relative to vehicle bracket 20) as a result of pivoting of the pedal arm 12 and pivot tube 68. The intermediate link 60 is a secondary link that is configured to provide a variable ratio of braking force, e.g., so that the ratio of movement applied to the pedal arm 12 is translated and varied as the pedal is pushed or pivoted and travels towards the dash 36. For example, the variable ratio pedal assembly provides a peak force ratio at a beginning of the braking action, e.g., first 25% or 30% of pedal arm and booster travel, while a remainder of the pedal travel has decreased geometric and force ratios.

Though not shown, a brake actuation sensor pin 72 can be provided in the embodiment shown in FIGS. 5-8 to connect the pedal assembly 100 to a brake actuation sensor (BAS), as described earlier.

The pivot tube 68 is attached to and configured for pivoting relative to the pedal/vehicle mounting bracket 120. As previously described in detail above, the activation links 64 and 162 are configured to pivot with the pivoting of the pivot tube 68, based on the pivotal movement of the pedal. A first end of the activation links 64 and 162 are configured to be connected to a pivot tube 68 or shaft (e.g., via welding) and a second end of the links 64 and 162 are connected to the elongated lever structure 13 of the pedal arm 12 (e.g. using pin 74 at 22; see FIG. 6). Under normal operation, as the pedal arm 12 rotates pivot tube 68 with respect to the dash 36 and vehicle structure 26, the at least a part of the push rod 14 is moved to apply a braking force.

At least one, if not both, of the links 162, 64 also includes a slot for receipt of transverse pin 70 therethrough. As seen in FIG. 6, transverse pin 70 extends through a slot 71 in link 64. The pin 70 is placed in the same manner as previously described through the links 162, 64 and in the slot 73 of the elongated lever structure 13. For example, if the pin 70 is an I-pin, its ends can be inserted and slid within the slots for connection thereto. The elongated lever structure 13 is connected to the activation link (e.g., formed by first and second links 162, 64, as shown in FIG. 5 and FIG. 6) by insertion of the transverse pin 70 through a slot (not shown) in the first link 162, through guide slots 29 of a release lever 124, and through a slot 71 in the second link 64 (and slid into position, as needed). As seen in FIG. 10A, under normal operation, the transverse pin 70 sits in the receiving slot 73 of the elongated lever structure 13, at the bottom of slots of the links 162, 64, and at a forward portion of guide slots 29 of the release lever 124. As explained in detail later, when a release mechanism is activated, the transverse pin 70 is guide in and along the slots and guide slots 29 and out of the receiving slot 73 of the elongate lever structure 13 so that pedal arm 12 disconnects from the lever 124. The elongated lever structure 13 is then capable of and configured to rotate on pin 74.

The links 162, 64 can be operatively attached to one another and connected to the pivot tube 78 at their first ends via holes 163, 164 in link 162 and hole 67 of link 64 in a similar manner as described previously with respect to FIGS. 1-4, using bushings 78 and 80 and the pivoting axle 66, with securement via fastener 33. The pivoting axle 66 can be inserted through the center bore of the connected pivot tube 68 and bushings 78, 80 when it is attached or welded to the links 162, 64, for example.

Accordingly, when assembled, the first and second links 162, 64 are secured relative to the pivot tube 68 (e.g., welded). Pivotal movement of the pedal arm 12 pivotally moves the pivot tube 68 relative to the pedal/vehicle mounting bracket 120, thus pivotally moving the links 162, 64 of the activation link. The activation link is thus configured to pivot or rotate with the pivot tube 68 upon any pivoting movement of the elongate lever structure 13 of the pedal 12.

The pivoting of pivot tube 68 in turn activates movement of the other links in the variable ratio link assembly. The pivotal movement of the pivot tube 68 is configured to actuate movement of the input link 52 (or booster receiver link) that is connected to the push rod 14 that activates the functional system (mechanical or electro-mechanical) of the vehicle. The input link 52 is operatively connected to the activation link or links (162, 64) via at least an intermediate link 60. The intermediate link 60 is a secondary link configured to provide a variable ratio of braking force, e.g., so that the ratio of movement applied to the pedal arm 12 is translated and varied as the pedal is pushed or pivoted and travels towards the dash 36.

In operation, when the pivotal movement of the pedal arm 12 pivotally moves the pivot tube 68 relative to the vehicle mounting bracket 20 via the activation link (links 162, 64), the pivotal movement of the pivot tube 68 actuates at least pivotal movement of the opposite end of the link 162. The pivotal movement of the link 162 actuates movement of the input link 52 about pin 138 to enable pushing of the push rod 14. Movement of the input link 52 is configured to actuate pivotal movement of the intermediate link 60 relative to both the input link 52 and the pedal/vehicle bracket 120. This results in a variation in angle between the input link 52 and the intermediate link 60. The variation in angle between the input link 52 and the intermediate link 60 creates a ratio that varies as the pedal arm 12 is moved. Accordingly, the ratio of braking force applied from the input link 52 to the push rod 14 is varied.

A portion of the first end of the elongated lever structure 13 can be yoke-shaped and connected to a release lever 124 of a release mechanism (the release mechanism being explained in detail further below). The release lever 124 can be formed from brackets 126 and 128 that are aligned and connected to form opposing walls. The brackets 126 and 128 can be connected via a pin 77 inserted through aligned holes, as seen in FIG. 8, for example. A pin 127 can be used to connect a portion of the release lever 124 to the vehicle structure, for example. Each bracket 126 and 128 of the release lever 124 can include aligned bores 23, holes or openings 25 and 27, and guide slots 29 when connected. The bores 23 are configured to receive the pivot tube 68 therethrough. The guide slots 29 are configured to receive the transverse pin 70 therethrough. The release lever 124 is configured to connect the elongated lever structure 13 of the pedal arm 12 with the at least one activation link, e.g., links 162 and 64, via insertion of pin 70 through guide slots 29 of the connected and aligned brackets 126 and 128 of the release lever 24 and in the elongated lever structure 13 (e.g., through receiving slot 73). The connection of the release lever 124 to the elongate lever structure 13 allows the activation links 162 and 64 to move with the pivoting of the elongate lever structure 13 in a first pivotal direction during normal operation to actuate movement of the input link 52. The release lever 124 remains in a first position during the pivoting of the pedal arm 12 in a first direction and the pivotal movement of the pivot tube 68 during an operation to actuate movement of the input link 52. In an embodiment, a shear pin (not shown) can be attached through a portion of the activation link(s) and into the release lever 124. The shear pin prevents rotation of the crash release lever 124 during assembly, for example, and the release lever 124 remains in its first position. Thus, under normal operation and circumstances, depression of the pedal 16 causes the elongated lever structure 13 to induce motion (pivotal rotation) to the pivot tube 68, while the release lever 124 maintains its position in the first position and does not move (the pivot tube 68 thus pivoting relative to the brackets 126 and 128 of the release lever 124, e.g., within its aligned bores 23).

In an embodiment, the release lever 124 is configured to substantially enclose at least a portion of the first end of the elongated lever structure 13 during normal operation. For example, the first end of the elongated structure that includes the receiving slot 73 can be inserted up into a slot formed by opposing walls of the brackets 126 and 128 of the release lever 124.

In accordance with the above structure, at the time of normal (braking) operation, a user or operator depresses pedal plate 16 in forward direction with their foot, rotating the pedal arm 12 with respect to the dash 36 and vehicle structure 26. When stepping force is applied to the pedal plate 16, the pedal arm 12 swings forwardly and rotates about a generally horizontal axis towards the front of the vehicle using the pivot tube 68 and pin 74. The pivoting motion of the pedal arm 12 pivots the second ends of the links 162 and 64 of the actuation link with the pivot tube 68 (swings counterclockwise), which in turn moves the input link 52 and intermediate link 60 about generally horizontal axes. Specifically, the second end of the link 162 swings the input link 52 forwardly around pin 138. Concurrently, the intermediate link 60 is pivoted relative to the input link 52 and pedal/vehicle bracket 120 to vary the movement of the input link 52, and thus the ratio of force applied via the push rod 14. The input link 52 is moved in a substantially forward direction. Therefore, the push rod 14 is pushed towards the front of the vehicle to operate the braking system. Generally, when force is applied, the spring or mechanism of the brake booster 28 is compressed. Use of the illustrated variable ratio (braking) structure to push the push rod 14 via links 162, 64, 60, and 52 improves the operational feeling of the pedal and allows for setting the pedal ratio to a desired value.

Accordingly, the herein disclosed exemplary embodiments of the variable ratio pedal assembly provide a four bar linkage mechanism designed to vary the application of the brake as compared to the pedal movement or range of travel. This disclosure addresses the force on the brake booster 28 (or other connected functional system) by applying a variable ratio to the booster when the pedal arm is moved. The disclosed variable ratio assembly aids in keeping brake pads off of the rotors, which in turn saves fuel and increases fuel economy, by allowing the ratio to change quickly relative to the rotors and the level of braking.

This mechanism provides a compact packaging solution for variable ratio pedals. Additionally, this mechanism allows for crash mechanism application/implementation to meet crash safety requirements.

The disclosed assembly decreases the ratio versus the pedal travel. In an embodiment, the ratio versus pedal travel ranges between approximately 2.0 and approximately 4.0 (inclusive). In another embodiment, the ratio can be set within a range between approximately 2.2 and approximately 3.5 (inclusive).

It further breaks small distance limitations as seen in prior art designs. For example, in previous designs, a link moves across (in between) two fixed mounting points, whereas in this disclosed mechanism, the intermediate link 60 rotates and changes its angles outside fixed mounting points. This allows the placement of the input link 52 below the mechanism. Previous designs also have a higher degree of movement.

The disclosed designs also resolves clearance issues with large size shoes and/or work boots (requirement by customer) in automotive brake pedal designs. For example, as noted with respect to FIG. 4, the distance D between the floor F and pivot point at 22 can be used to determine and contain the links of the variable ratio linkage assembly above the instrument panel 36 during manufacturing. This improves customer satisfaction, as well as costs, weights, and manufacturing concerns as compared to previous designs.

Generally, when the pedal is a brake pedal, should a driver encounter a situation that may result in an incident, for example, the driver will quickly and forcefully apply force via his foot to the pedal part 16 of the pedal 10. Should impact or collision from such an incident occur (e.g., caused by inertia, kinetic energy, etc.), however, the forces of the impact may cause relative movement of the vehicle structure (and its parts and the driver) and the front of the vehicle, as noted above. Thus, the pedal 10 may include a release mechanism to assist in disconnecting or decoupling at least part of the pedal 10, and prevent energy from being transmitted to a driver's foot.

In accordance with an embodiment, the release mechanism may comprise a mechanism similar to any one of those shown and described in U.S. Pat. No. 7,987,743 and/or U.S. patent application Ser. No. 13/831,245, filed on Mar. 14, 2013, both of which are hereby incorporated by reference in their entirety. Accordingly, it should be understood that features of the links 62, 64 of the activation link and pedal structure are not intended to be limited to the accompanying illustrations, and that features shown in the above incorporated references can be utilized or used to replace those herein, without departing from the scope of this disclosure.

FIGS. 9A-9E show side views of the exemplary embodiment of a variable ratio pedal assembly as shown in FIGS. 1-4, illustrating an exemplary release mechanism of the pedal assembly 10 and its actuation thereof upon a collision. The release mechanism includes the release lever 24 and an actuation mechanism in the form of a bracket 123. The release lever 24 is configured to pivot between a first position and a second position about the pivot tube 68 during vehicle collision. The release lever 24 has a contact portion for being contacted to pivot the release lever 24 between the first and second positions. As previously noted, during normal operation to actuate movement of the input link, the release lever 24 is held in place and does not move during the pivoting of the pedal arm to actuate movement of the input link 52 in a first direction (e.g., clockwise). The release lever 24 is configured to disconnect the first end of the elongated lever structure 13 of the pedal arm 12 from the activation link(s) 62, 64 in the second position through its pivoting in a second direction upon and/or after impact. The second direction is an opposite, pivotal direction to the first direction for actuating movement of the input link 52 (e.g., counterclockwise). The actuation mechanism or bracket 123 is configured for mounting to a vehicle structure in spaced relation to the contact portion of the release lever (not shown).

In an embodiment, the release lever is configured to disconnect the first end of the elongated lever structure 13 of the pedal arm from being substantially enclosed by the release lever 24 in the second position. That is, the elongated lever structure 13 can be released from the slot formed by the opposing parallel walls of the release lever 24.

Accordingly, the geometry and shape of the parts are such that, in the event of a crash, the release lever 24 is struck by the bracket 123 mounted to the vehicle's structure adjacent the release lever 24, such as shown in FIG. 9A. The bracket 123 contacts the contact portion during a vehicle collision and actuates the pivoting of the release lever 24 from the first position to the second position in the second direction to disconnect the first end of the elongated lever structure 13 of the pedal arm from the at least one activation link(s) 62, 64 and/or from the release lever 24. Force from the bracket 123 upon contact with the release lever 24 causes rotation of the release lever 24 and can thus cause shearing of a shear pin 76 (e.g., which may be made of plastic) used with the release mechanism. The transverse pin 70 is provided in the receiving slot 73, as well as in a bottom of slots 69, 71 of respective links 62, 64 and a bottom of guide slot 29. As shown in FIG. 9B, for example, the pivoting of the release lever 24 is activated in a backwards or in the second direction opposite the direction for actuating movement of the input link 52. Also, the transverse pin 70 begins movement along guide slot 29 of the release lever 24, as indicated by the arrow in FIG. 9B. The reaction bracket will then cause the release lever 24 to further rotate as shown in FIGS. 9C and 9D. As the release lever 24 rotates, transverse pin 70 moves further along the guide slot 29, as well as in an upward direction along slot 69 and slot 71 (not shown). Upon rotation to its second position in FIG. 9E, the transverse pin 70 is positioned at a top of the guide slots 29 and slots 69 and 71. Further, the release lever 24 disconnects from the elongated lever structure 13 of the pedal arm 12 by forcing release of a first end of the elongated pedal structure 13 from within the release lever 24 (out of its slot). The transverse pin 70 is removed from receiving slot 73, and the pedal structure and release lever 24 are no longer connected, as well as the pedal structure and the at least one activation link(s) are no longer connected. Thus, any translational movement between the pushrod 14 and pedal arm 12 is disconnected. Disconnection of the pedal assembly reduces and/or prevents energy from being transmitted to the driver's foot, thereby reducing injury to the driver.

The activation of the release lever 124 for the embodiment illustrated FIGS. 5-8 is performed in a similar manner. FIGS. 10A-10C show side views of the exemplary embodiment of a variable ratio pedal assembly as shown in FIGS. 5-8, illustrating an exemplary release mechanism of the pedal assembly 100 and its actuation thereof upon a collision. The release mechanism includes the release lever 124 and an actuation mechanism in the form of a bracket (not shown, but the bracket may be similar to bracket 123 as shown in FIGS. 9A-9E). The release lever 124 is configured to pivot between a first position and a second position about the pivot tube 68 during vehicle collision. The release lever 124 has a contact portion for being contacted to pivot the release lever 124 between the first and second positions. As previously noted, during normal operation to actuate movement of the input link, the release lever 124 is held in place and does not move during the pivoting of the pedal arm to actuate movement of the input link 52 in a first direction (e.g., clockwise). The release lever 124 is configured to disconnect the first end of the elongated lever structure 13 of the pedal arm 12 from the activation link(s) 162, 64 in the second position through its pivoting in a second direction upon and/or after impact. The second direction is an opposite, pivotal direction to the first direction for actuating movement of the input link 52 (e.g., counterclockwise). The actuation mechanism or bracket is configured for mounting to a vehicle structure in spaced relation to the contact portion of the release lever (not shown).

In an embodiment, the release lever 124 is configured to disconnect the first end of the elongated lever structure 13 of the pedal arm from being substantially enclosed by the release lever 124 in the second position. That is, the elongated lever structure 13 can be released from the slot formed by the opposing parallel walls of the brackets 126 and 128 of the release lever 124.

Accordingly, the geometry and shape of the parts are such that, in the event of a crash, the release lever 124 is struck by the bracket or actuation mechanism mounted to the vehicle's structure adjacent the release lever 124, whose impact can be understood by the depiction in FIG. 10A. The bracket contacts the contact portion during a vehicle collision and actuates the pivoting of the release lever 124 from the first position to the second position in the second direction to disconnect the first end of the elongated lever structure 13 of the pedal arm from the at least one activation link(s) 162, 64 and/or from the release lever 124. Force from the bracket upon contact with the release lever 124 causes rotation of the release lever 124 and can thus cause shearing of a shear pin (not shown). The transverse pin 70 is provided in the receiving slot 73, as well as in a bottom of slots 69, 71 of respective links 162, 64 and a bottom of guide slot 29. As shown in FIG. 10B, for example, the pivoting of the release lever 124 is activated in a backwards or in the second direction opposite the direction for actuating movement of the input link 52. Also, the transverse pin 70 begins movement along guide slot 29 of the release lever 24. The reaction bracket will then cause the release lever 124 to further rotate. As the release lever 24 rotates, transverse pin 70 moves further along the guide slot 29, as well as in an upward direction along slot 69 and slot 71 (not shown). Upon rotation to its second position in FIG. 10C, the transverse pin 70 is positioned at a top of the guide slots 29 and slots 69 and 71. Further, the release lever 124 disconnects from the elongated lever structure 13 of the pedal arm 12 by forcing release of a first end of the elongated pedal structure 13 from within the release lever 124 (out of its slot formed by the aligned and connected brackets 126 and 128). The transverse pin 70 is removed from receiving slot 73, and the pedal structure and release lever 124 are no longer connected, as well as the pedal structure and the at least one activation link(s) are no longer connected. Thus, any translational movement between the pushrod 14 and pedal arm 12 is disconnected. Disconnection of the pedal assembly reduces and/or prevents energy from being transmitted to the driver's foot, thereby reducing injury to the driver.

Also, it should be noted that the pedal assembly 10 may also be used in combination with any number of sensing devices or sensors, such as, but not limited to, speed-sensing sensors (i.e., speed the vehicle is traveling) or air bag deployment sensors. Additionally, in some instances, it is envisioned that a predetermined amount of force or vehicle travel speed must be met in order for the pedal structure to be released.

Accordingly, it should be understood that the embodiments herein provide examples of aspects and features provided by this disclosure. One aspect of the invention provides a variable ratio pedal assembly for operating a push rod that activates a functional system of a vehicle. The pedal assembly includes a pedal arm having an elongated lever structure with a first end and a second end; a pedal plate provided on the second end of the elongated lever structure of the pedal arm for depression by a foot of a driver; a vehicle mounting bracket; a pivot tube configured for pivoting relative to the vehicle mounting bracket; at least one activation link, an input link, and an intermediate link. A first end of the at least one activation link is connected to the pivot tube for pivoting therewith and a second end of the at least one activation link is connected to the elongated lever structure of the pedal arm. The input link connects to a push rod that activates the functional system of the vehicle and is operatively connected to the activation link. A first end of the intermediate link is pivotally connected to the input link and a second end of the intermediate link is pivotally connected to the vehicle bracket. Pivotal movement of the pedal arm is configured to pivotally move the pivot tube relative to the vehicle mounting bracket via the activation link. The pivotal movement of the pivot tube is configured to actuate movement of the input link to enable pushing of the push rod as a result of pivoting of the pedal arm. The movement of the input link is configured to actuate pivotal movement of the intermediate link relative to the input link and the vehicle bracket, resulting in a variation in angle between the input link and the intermediate link. The variation in angle between the input link and the intermediate link creates a ratio that varies as the pedal arm is moved.

Another aspect of the invention provides a vehicle having a variable ratio pedal assembly as noted above.

While the principles of the invention have been made clear in the illustrative embodiments set forth above, it will be apparent to those skilled in the art that various modifications may be made to the structure, arrangement, proportion, elements, materials, and components used in the practice of the invention.

For example, other additional or alternative sensing, electronic, or communication devices can be used with either or both pedal assemblies disclosed herein and are not limited to those that are illustrated in the Figures (e.g., BAS device 142 as shown in FIG. 8).

Also, it should be understood that each structure of either pedal assembly 10 or 100 can be altered without departing from the scope of this disclosure. For example, pedal bracket 20 and/or 120 may be combined or incorporated into or with the block mount 19 (whether made from plastic or metal, for example).

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A variable ratio pedal assembly for operating a push rod that activates a functional system of a vehicle, the variable ratio pedal assembly comprising:
    a pedal arm comprising an elongated lever structure with a first end and a second end and configured for movement between a first arm position and a second arm position;
    a pedal plate provided on the second end of the elongated lever structure of the pedal arm for depression by a foot of a driver;
    a vehicle mounting bracket;
    a pivot tube configured for pivoting relative to the vehicle mounting bracket, the first end of the pedal arm being operatively connected to the pivot tube to provide pivotal movement to pivot tube during movement of the pedal arm between the first and second arm positions;
    at least one activation link, a first end of the at least one activation link attached to the pivot tube for pivoting therewith and a second end of the at least one activation link attached to the elongated lever structure of the pedal arm;
    an input link for connection to a push rod that activates the functional system of the vehicle and operatively connected to the at least one activation link;
    an intermediate link, a first end of the intermediate link being pivotally connected to the input link via a first connector and a second end of the intermediate link being pivotally connected to the vehicle mounting bracket via a second connector, the pivotal connections at the first and second ends of the intermediate link being configured to allow pivoting of the intermediate link via the first and second connectors as a result of movement of the pedal arm from the first arm position to the second arm position and cause a variation in angle between the input link and the intermediate link at the first arm position and the second arm position of the pedal arm;
    wherein the pivot tube and the at least one activation link are configured to pivotally move relative to the vehicle mounting bracket during movement of the pedal arm, the activation link being configured to move via the attachments at the first and second ends thereof,
    wherein the operative connection between the at least one activation link and the input link is configured to actuate movement of the input link to enable pushing of the push rod during movement of the pedal arm, and
    wherein the variation in angle between the input link and the intermediate link results in application of a variable ratio of force to the push rod between the first arm position and the second arm position of the pedal arm.

2. The pedal assembly according to claim 1, wherein the functional system of the vehicle is a brake system.

3. The pedal assembly according to claim 2, wherein the pedal arm is a brake pedal arm for operating a brake booster input element of the vehicle and wherein the input link is constructed to be connected to the push rod of the brake booster input element and configured to operate the brake booster input element via the connection.

4. The pedal assembly according to claim 1, wherein the at least one activation link, the input link, and the intermediate link are configured to be mounted above an underside of an instrument panel in the vehicle.

5. The pedal assembly according to claim 1, wherein the at least one activation link forms a casing at least partially encasing at least a portion of both the input link and the intermediate link therein.

6. The pedal assembly according to claim 1, wherein the at least one activation link comprises a first link and a second link in a parallel configuration, a first end of each of the first and second links of the at least one activation link attached to the pivot tube and a second end of each of the first and second links attached to the elongated lever structure of the pedal arm, and wherein the activation links are configured to move via their attachments at the first and second ends thereof.

7. The pedal assembly according to claim 1, further comprising:

a release mechanism comprising a release lever and an actuation mechanism, the release lever being configured to pivot between a first position and a second position about the pivot tube, the release lever having a contact portion for being contacted to pivot the release lever between the first and second positions;

the release lever configured to operatively connect the elongated lever structure of the pedal arm with the at least one activation link;

wherein in the first position of the release mechanism the pedal arm and pivot tube are configured for pivotal movement in a first direction to actuate movement of the input link via the operative connection between the at least one activation link and the input link;

wherein the release lever is configured for pivotal movement in a second direction to disconnect the operative connection between the elongated lever structure of the pedal arm and the at least one activation link in the second position, the second direction being an opposite direction to the first direction for actuating movement of the input link, and the actuation mechanism being configured for mounting to a vehicle structure in spaced relation to the contact portion of the release lever, the actuation mechanism configured to contact the contact portion of the release lever and actuate the pivotal movement of the release lever from the first position to the second position in the second direction via the contact with the contact portion of the release lever.

8. The pedal assembly according to claim 7, wherein the release lever is configured to substantially enclose at least a portion of the elongated lever structure during the operation to actuate movement of the input link, and wherein the release lever is configured to disconnect the elongated structure of the pedal arm from being substantially enclosed by the release lever in the second position.

9. A vehicle comprising a variable ratio pedal assembly, the variable ratio pedal assembly comprising:
    a pedal arm comprising an elongated lever structure with a first end and a second end and configured for movement between a first arm position and a second arm position;
    a pedal plate provided on the second end of the elongated lever structure of the pedal arm for depression by a foot of a driver;
    a vehicle mounting bracket;
    a pivot tube configured for pivoting relative to the vehicle mounting bracket, the first end of the pedal arm being operatively connected to the pivot tube to provide pivotal movement to pivot tube during movement of the pedal arm between the first and second arm positions;
    at least one activation link, a first end of the at least one activation link attached to the pivot tube for pivoting therewith and a second end of the at least one activation link attached to the elongated lever structure of the pedal arm;
    an input link connected to a push rod that activates the functional system of the vehicle and operatively connected to the at least one activation link;
    an intermediate link, a first end of the intermediate link being pivotally connected to the input link via a first connector and a second end of the intermediate link being pivotally connected to the vehicle mounting bracket via a second connector, the pivotal connections at the first and second ends of the intermediate link being configured to allow pivoting of the intermediate link via the first and second connectors as a result of movement of the pedal arm from the first arm position to the second arm position and cause a variation in angle between the input link and the intermediate link at the first arm position and the second arm position of the pedal arm;

wherein the pivot tube and the at least one activation link are configured to pivotally move relative to the vehicle mounting bracket during movement of the pedal arm, the activation link being configured to move via the attachments at the first and second ends thereof, wherein the operative connection between the at least one activation link and the input link is configured to actuate movement of the input link to enable pushing of the push rod during movement of the pedal arm, and wherein the variation in angle between the input link and the intermediate link results in application of a variable ratio of force to the push rod between the first arm position and the second arm position of the pedal arm.

10. The vehicle according to claim 9, wherein the functional system of the vehicle is a brake system.

11. The vehicle according to claim 10, wherein the pedal arm is a brake pedal arm for operating a brake booster input element of the vehicle and wherein the input link is constructed to be connected to the push rod of the brake booster input element and configured to operate the brake booster input element via the connection.

12. The vehicle according to claim 9, wherein the at least one activation link, the input link, and the intermediate link are mounted above an underside of an instrument panel in the vehicle.

13. The vehicle according to claim 9, wherein the at least one activation link forms a casing at least partially encasing at least a portion of both the input link and the intermediate link therein.

14. The vehicle according to claim 9, wherein the at least one activation link comprises a first link and a second link in a parallel configuration, a first end of each of the first and second links of the at least one activation link attached to the pivot tube and a second end of each of the first and second links attached to the elongated lever structure of the pedal arm, and wherein the activation links are configured to move via their attachments at the first and second ends thereof.

15. The vehicle according to claim 9, further comprising:
    a release mechanism comprising a release lever and an actuation mechanism, the release lever being configured to pivot between a first position and a second position about the pivot tube, the release lever having a contact portion for being contacted to pivot the release lever between the first and second positions;
    the release lever configured to operatively connect the elongated lever structure of the pedal arm with the at least one activation link;
    wherein in the first position of the release mechanism the pedal arm and pivot tube are configured for pivotal movement in a first direction to actuate movement of the input link via the operative connection between the at least one activation link and the input link;
    wherein the release lever is configured for pivotal movement in a second direction to disconnect the operative connection between the elongated lever structure of the pedal arm and the at least one activation link in the second, the second direction being an opposite direction to the first direction for actuating movement of the input link, and
    the actuation mechanism being configured for mounting to a vehicle structure in spaced relation to the contact portion of the release lever, the actuation mechanism configured to contact the contact portion of the release lever and actuate the pivotal movement of the release lever from the first position to the second position in the second direction via the contact with the contact portion of the release lever.

16. The vehicle according to claim 15, wherein the release lever is configured to substantially enclose at least a portion of the first end of the elongated lever structure during normal operation, and wherein the release lever is configured to disconnect the first end of the elongated structure of the pedal arm from being substantially enclosed by the release lever in the second position.

17. A variable ratio pedal assembly for operating a push rod that activates a functional system of a vehicle, the variable ratio pedal assembly comprising:
   a pedal arm comprising an elongated lever structure with a first end and a second end and configured for movement between a first arm position and a second arm position;
   a pedal plate provided on the second end of the elongated lever structure of the pedal arm for depression by a foot of a driver;
   a vehicle mounting bracket;
   a pivot tube configured for pivoting relative to the vehicle mounting bracket, the first end of the pedal arm being operatively connected to the pivot tube to provide pivotal movement to pivot tube during movement of the pedal arm between the first and second arm positions;
   an activation link, a first end of the at least one activation link attached to the pivot tube for pivoting therewith and a second end of the activation link attached to the elongated lever structure of the pedal arm;
   an input link for connection to a push rod that activates the functional system of the vehicle and operatively connected to the activation link;
   an intermediate link having a first pivoting connector at a first end and a second pivoting connector at a second end thereof, the first end of the intermediate link being pivotally connected to the input link via its first pivoting connector, and the pivoting connectors being configured to allow pivoting of the intermediate link relative to the input link and the activation link as a result of movement of the pedal arm from the first arm position to the second arm position and cause a variation in angle between the input link and the intermediate link at the first arm position and the second arm position of the pedal arm;
   wherein a portion of the activation link at least partially encases a portion of both the input link and the intermediate link;
   wherein the pivot tube and the at least one activation link are configured to pivotally move relative to the vehicle mounting bracket during movement of the pedal arm, the activation link being configured to move via the attachments at the first and second ends thereof,
   wherein the operative connection between the at least one activation link and the input link is configured to actuate movement of the input link to enable pushing of the push rod during movement of the pedal arm, and
   wherein the variation in angle between the input link and the intermediate link results in application of a variable ratio of force to the push rod between the first arm position and the second arm position of the pedal arm.

18. The pedal assembly according to claim 17, wherein the functional system of the vehicle is a brake system.

19. The pedal assembly according to claim 18, wherein the pedal arm is a brake pedal arm for operating a brake booster input element of the vehicle and wherein the input link is constructed to be connected to the push rod of the brake booster input element and configured to operate the brake booster input element via the connection.

20. The pedal assembly according to claim 17, wherein the activation link, the input link, and the intermediate link are configured to be mounted above an underside of an instrument panel in the vehicle.

21. The pedal assembly according to claim 17, wherein the activation link comprises a first link and a second link in a parallel configuration, a first end of each of the first and second links of the at least one activation link attached to the pivot tube and a second end of each of the first and second links attached to the elongated lever structure of the pedal arm, and wherein the activation links are configured to move via their attachments at the first and second ends thereof.

22. The pedal assembly according to claim 17, further comprising:
   a release mechanism comprising a release lever and an actuation mechanism, the release lever being configured to pivot between a first position and a second position about the pivot tube, the release lever having a contact portion for being contacted to pivot the release lever between the first and second positions;
   the release lever configured to operatively connect the elongated lever structure of the pedal arm with the at least one activation link;
   wherein in the first position of the release mechanism the pedal arm and pivot tube are configured for pivotal movement in a first direction to actuate movement of the input link via the operative connection between the at least one activation link and the input link;
   wherein the release lever is configured for pivotal movement in a second direction to disconnect the operative connection between the elongated lever structure of the pedal arm and the at least one activation link in the second position, the second direction being an opposite direction to the first direction for actuating movement of the input link, and
   the actuation mechanism being configured for mounting to a vehicle structure in spaced relation to the contact portion of the release lever, the actuation mechanism configured to contact the contact portion of the release lever and actuate the pivotal movement of the release lever from the first position to the second position in the second direction via the contact with the contact portion of the release lever.

23. The pedal assembly according to claim 22, wherein the release lever is configured to substantially enclose at least a portion of the elongated lever structure during the operation to actuate movement of the input link, and wherein the release lever is configured to disconnect the elongated structure of the pedal arm from being substantially enclosed by the release lever in the second position.

* * * * *